(12) United States Patent
Ruellan et al.

(10) Patent No.: US 10,075,501 B2
(45) Date of Patent: Sep. 11, 2018

(54) METHOD AND DEVICE FOR PROCESSING WEB REQUESTS

(71) Applicant: CANON KABUSHIKI KAISHA, Tokyo (JP)

(72) Inventors: Hervé Ruellan, Rennes (FR); Youenn Fablet, La Dominelais (FR); Romain Bellessort, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 14/728,865

(22) Filed: Jun. 2, 2015

(65) Prior Publication Data

US 2015/0358385 A1 Dec. 10, 2015

(30) Foreign Application Priority Data

Jun. 4, 2014 (GB) .................................. 1409940.2
Jun. 4, 2014 (GB) .................................. 1409941.0
Jul. 18, 2014 (GB) .................................. 1412850.8

(51) Int. Cl.
*G06F 15/16* (2006.01)
*H04L 29/08* (2006.01)
*H04L 29/06* (2006.01)
*G06F 9/48* (2006.01)

(52) U.S. Cl.
CPC .............. *H04L 67/02* (2013.01); *G06F 9/48* (2013.01); *H04L 67/42* (2013.01); *H04L 69/03* (2013.01)

(58) Field of Classification Search
CPC ............ H04L 67/02; H04L 67/42; G06F 9/48

USPC ........................................ 709/203, 224–225
See application file for complete search history.

(56) References Cited

U.S. PATENT DOCUMENTS

| | | | | |
|---|---|---|---|---|
| 8,612,450 | B1* | 12/2013 | Proffit | G06F 17/30817 707/740 |
| 2002/0120744 | A1* | 8/2002 | Chellis | G06F 9/50 709/226 |
| 2005/0273460 | A1* | 12/2005 | Abrams | G06F 17/3092 |
| 2009/0216783 | A1* | 8/2009 | Gebhart | G06F 9/485 |
| 2015/0350100 | A1* | 12/2015 | Biderman | H04L 47/6215 709/219 |

OTHER PUBLICATIONS

M Belshe et al, Hypertext Transfer Protocol version 2; draft-ietf-httpbis-http2-12, Apr. 23, 2014 (Apr. 23, 2014).

* cited by examiner

*Primary Examiner* — Duyen My Doan
(74) *Attorney, Agent, or Firm* — Canon U.S.A., Inc. IP Division

(57) ABSTRACT

The invention relates to a device and a method for processing requests. In particular, the invention concerns building a dependency tree between the requests received from the client device for prioritizing the processing of the requests by the server device; maintaining a list of requests of the dependency tree in their removal order from the dependency tree while the server device is prioritizing the processing of the requests; and removing a selection of requests from the dependency tree wherein the selection is based on the order of requests in the list.

24 Claims, 11 Drawing Sheets

METHOD AND DEVICE FOR PROCESSING WEB REQUESTS

This application claims the benefit under 35 U.S.C. § 119(a)-(d) of United Kingdom Patent Applications No. 1409940.2, filed on Jun. 4, 2014 and entitled "METHOD AND DEVICE FOR PROCESSING WEB REQUESTS", No. 1409941.0, filed on Jun. 4, 2014 and entitled "METHOD AND DEVICE FOR PROCESSING WEB REQUESTS", No. 1412850.8, filed on Jul. 18, 2014 and entitled "METHOD AND DEVICE FOR PROCESSING WEB REQUESTS", which are incorporated herein by reference in their entirety.

FIELD OF THE INVENTION

The present invention relates generally to communication networks and more specifically to a method and a device for processing requests and responses exchanged between a server device and a client device over one connection.

The invention particularly applies to the processing of HTTP/2 messages which is described below for ease of explanation.

BACKGROUND OF THE INVENTION

HTTP/2 is a new version of the HTTP protocol currently being specified by the IETF (see HTTP version 2, Internet draft dated Feb. 13, 2014, available at http://tools.ietf.org/html/draft-ietf-httpbis-http2-10).

It is well-known that the HTTP protocol allows a client device and a server device to communicate through the exchange of requests and responses. Conventionally, requests are sent by the client device to the server device, which in return, sends responses.

As defined by the IETF, the HTTP requests and responses are transmitted over a TCP connection established between the client device and the server device.

The earliest versions of HTTP relied on different TCP connections to respectively convey each pair of request/response.

The most recent versions of HTTP allow reusing the same TCP connection to exchange a plurality of pairs of (request, response).

In the particular case of HTTP/2, one and the same TCP connection is used between the client and server devices to exchange all the requests and responses. This makes it possible for HTTP/2 to multiplex requests and responses and even to intermingle parts of them. For instance, the client device may start sending a first request, then sends a second request, and then finishes sending its first request. On the other side, the server device may respond to the requests from the client device in any order, for example by intermingling parts of different responses.

To handle efficiently each pair of request and response, and thus to allow efficient multiplexing, HTTP/2 uses a stream identifier (ID), usually a 31-bit integer value, to identify each of the pairs. A stream can be seen as a bidirectional channel between the client and server devices used to exchange one request and the corresponding response in the established TCP connection.

Each time a new request is sent by the client device, a new stream is created. The request is sent through one or more HTTP/2 frames as defined in the above publication, each of them storing the corresponding stream ID in its frame header. The above multiplexing thus consists in multiplexing such HTTP/2 streams within the same TCP connection.

A stream is usually closed once the response associated with a given request has been received by the client device that originated said request.

Since the stream is provided for a single request and the corresponding response, the words "stream" and "request" or "stream" and "response" are indifferently used in the description below because the processing of a request/response by any of the client and server devices means the same as the processing of the corresponding stream by the same device.

Be HTTP/2 or any other protocol where a plurality of requests and responses can be sent in parallel within one and the same connection, the way, and more particularly the order in which, the server device processes the plurality of requests received through the same connection is an issue for the client device. This is because the latter may desire that some requests be processed in priority compared to other requests.

For example, if the client requests two images, one of which is a photo while the other one is a background image, the client may prefer receiving the photo first, which is of more interest to the user. On the contrary, if the two images are two photos from a photo album for example, the client may prefer receiving both photos in parallel in order to start displaying some results to the user as soon as possible. In fact, displaying the images progressively, i.e. starting by low resolution images then full resolution images, makes the displaying looks more reactive to the user compared to the situation where full resolution images are downloaded at first.

HTTP/2 introduces priorities to the requests for the client device to specify in which order it wishes to receive responses corresponding to different requests, or at least to try to drive the server device to process some requests in priority. To do so, the client device may specify a priority parameter value within a frame used to create a new stream, known as HEADERS frame, or within a frame, known as PRIORITY frame, that can be sent at any time for an existing stream to dynamically modify priorities of pending requests.

For example, in the above publication, a 31-bit priority parameter integer value is provided with 0 representing the highest priority and $2^{31}-1$ representing the lowest priority (or vice versa). The priority parameter integer value expresses the relative priority of a stream (or a request). The server device can use (but this is not mandatory) this information to preferentially order the processing of received requests.

In HTTP/2, the prioritization information sent by the client device is used by the server device to create a dependency tree between the received requests (streams). The "dependency tree" is also referred to as a "priority tree" and the two terms are indifferently used in the description below.

In the dependency tree, a first stream can be made dependent on a second stream, which means that processing the first stream shouldn't occur before the completion of the processing of the second stream. Two streams can be made dependent on the same parent stream. Once the processing of the parent stream is completed, the two dependent streams are processed in parallel. In other words, a dependent stream should be allocated resources by the server only if all of the streams that it depends on (the chain of parent streams up to the root of the tree) are either closed, or it is not possible to make progress on them.

In addition, all dependent streams may be allocated an integer weight between 1 and 256 representing the proportion of resources allocated to them, i.e. streams with the same parent should be allocated resources proportionally to their weight. Thus, if stream B depends on stream A and B is assigned a weight 4, and C depends on stream A and C is assigned a weight 12, and if no progress can be made on A, stream B ideally receives one third of the resources allocated to stream C.

Resources necessary to process a request may be of different types and may include CPU processing time, system memory and network bandwidth for sending the response back to the client device. The resources may also include storage-related resources such as a hard disk, or database-related resources. Among these resources, the bandwidth has usually the strongest impact on the response time, and it can be easily split between several streams, allowing a parallel transmission of several responses.

In the example of FIG. 1a, both streams B and C depend on the same parent stream A. This means that the server should first process stream A, then, once the processing of stream A is completed, the server processes streams B and C in parallel. In addition, the weight assigned to B is 16, while the weight assigned to C is 32, meaning two times more resources should be allocated to C than to B. In particular, this means that C should receive ⅔ of the bandwidth, while B receives only ⅓ of the bandwidth.

A new stream is by default not dependent on any other stream, but is instead a new top level stream, being as such processed in parallel with all the other top level streams. The client can chose to make the new stream dependent on another existing stream, either by adding it as a new dependent stream on the existing stream, or inserting it between the existing stream and its existing dependencies. In the example of FIG. 1b, the stream D is added as a new dependency of stream A, and will be processed in parallel with the existing dependencies B and C. In the example of FIG. 1c, the stream D is added as an exclusive dependency of stream A, the existing dependencies of A, streams B and C, become dependencies of this new stream D. Stream D will be processed after stream A, but before streams B and C.

A stream can be removed for the dependency tree, for example when it is closed, meaning that both the request and the response transmitted over it are finished. In this case, any stream depending on it becomes dependent on its parent. In addition its weight is split between its dependencies, according to their relative weights. For example, in FIG. 1e, stream B is removed (from left tree in the figure). The two dependencies of stream B, streams D and E become dependent on its parent stream, A (right tree in the figure). The weight of stream B, 16, is split between D and E, according to their relative weight. The new weight of D is 16*4/(4+8)=5.3, while the new weight of E is 16*8/(4+8)=10.7.

If the removed stream was a top level stream, then its dependencies become top level streams.

The prioritization of one or several streams can be changed after their creation. The client can change the priority of an existing stream by changing the parent stream it depends on and/or by changing its weight. When changing the parent stream of a given stream, the stream is moved with all its dependencies. In the example of FIG. 1d, the stream B initially depending on stream A (left tree) is reprioritized to depend on stream C (right tree). Stream D remains dependent on stream B through this reprioritization process.

Because of memory constraints, the server device should keep the total number of recorded streams in the dependency tree under a certain limit.

When a stream is removed from the dependency tree, its dependencies are moved/placed to become dependent on the parent of the closed stream. The weights of new dependencies are recalculated by distributing the weight of the dependency of the closed stream proportionally based on the weights of its dependencies.

Streams that are removed from the dependency tree cause some prioritization information to be lost.

For example, taking the priority tree of FIG. 1a, the client may want to add a new stream D, depending on stream B. It sends a message to the server for creating this stream and defining its priority. If the server has finished processing and sending the response on stream B, it may not only have closed stream B, but also discarded any information about stream B from its memory. In this case, upon receiving the stream creation order from the client and the associated priority definition, the server is able to create the new stream D, but it is not able to insert it correctly in the priority tree. Hence, the server will not be able to process the different requests in the order best suited to the client. This can lead at best to inefficiencies, or at worse, to bad user experience.

HTTP/2 specification recommends that the size limit of the dependency tree should be at least equal to the maximum number of streams that the client can open simultaneously, and that a stream should be kept some time after it is closed. But these basic rules are not sufficient to provide good performances and optimal user experience.

The present invention has been devised to address at least one of the foregoing concerns.

SUMMARY OF THE INVENTION

According to a first aspect of the invention, there is provided a method of processing requests in a server device, comprising, at the server device, the steps of:

receiving requests from a client device within one connection established with the client device;

receiving priority parameter values, associated with the received requests, indicative of the relative order at which the client device wishes the server device to process the requests;

building a dependency tree between the received requests using the associated priority parameter values for prioritizing the processing of the requests by the server device;

maintaining a list of requests of the dependency tree in their removal order from the dependency tree while the server device is prioritizing the processing of the requests; and removing a selection of requests from the dependency tree wherein the selection is based on the order of requests in the list.

In one implementation, the maintaining comprises updating the order of removal of requests in the list based on at least one predefined rule. In a variant, one predefined rule is to keep he order of removal of a request, that is parent of a plurality of requests in the dependency tree, following the order of removals of its descendants.

In one implementation, the prioritizing the requests processing is triggered by the receiving of new priority parameter values from the client device.

In one implementation, the method further comprising assigning relevance values to the requests of the list indicative of the order of removal of the requests from the dependency tree, where requests with lowest relevance values are to be removed first.

In one implementation, the method further comprising processing the received requests in an order that takes into account the tree of dependencies between the requests.

In one implementation, the method further comprising transmitting to the client device responses resulting from the processing of the requests.

In one implementation, each request is associated with a stream identified by a stream identifier, and wherein a closed stream corresponds to a processed request.

In one implementation, the list of requests contains only processed requests of the dependency tree.

In one implementation, the maintaining of the list comprises the steps of:

creating a list containing all processed requests of the dependency tree; and ordering the list in the removal order of the requests according to at least one rule.

Advantageously, the at least one rule is the requests creation order and wherein the ordering causes the less recently created requests to be removed first.

In one implementation, the application of the ordering step is performed each time a newly created descendant request is attached to the parent request.

In one implementation, the at least one rule is the requests usage order and wherein the ordering causes the less recently used requests to be removed first.

In one implementation, the building of the dependency tree comprises:

obtaining identifiers of the streams associated with the received requests; and storing in memory the stream identifiers along with priority information linking hierarchically the stream identifiers.

In one implementation, the building of the dependency tree comprises:

obtaining identifiers of idle and/or virtual streams not associated with the received requests; and storing in memory the identifiers of the idle and/or virtual streams and the identifiers of the streams associated with the received requests along with priority information linking hierarchically the identifiers.

In one implementation, the removing of the selection of requests comprises deleting from memory the corresponding stream identifiers and updating the hierarchical relationship between the remaining requests of the dependency tree.

In a particular implementation, the order of processing the requests is solely based on the built dependency tree.

In a variant implementation, the order of processing the requests is based on the built dependency tree and additional priority criteria local to the server device.

Particularly, the requests and corresponding responses are exchanged between the client device and the server device according to the HTTP protocol.

According to a second aspect of the invention, there is provided a method of sending requests to a server device, comprising, at a client device, the steps of:

sending requests to the server device within one connection established with the server device;

sending priority parameter values, associated with the sent requests, indicative of the relative order at which the client device wishes the server device to process the requests;

building a dependency tree between the sent requests using the associated priority parameter values for prioritizing the processing of the requests by the server device;

maintaining a list of requests of the dependency tree in their removal order from the dependency tree; and removing a selection of requests from the dependency tree wherein the selection is based on the order of requests in the list;

wherein the priority parameter values sent to the server device are associated with sent requests that still belong to the maintained list after the removing step is executed.

According to a third aspect of the invention, there is provided a server device in a communication network, comprising:

means for receiving requests from a client device within one connection established with the client device;

means for receiving priority parameter values, associated with the received requests, indicative of the relative order at which the client device wishes the server device to process the requests;

means for building a dependency tree between the received requests using the associated priority parameter values for prioritizing the processing of the requests by the server device;

means for maintaining a list of requests of the dependency tree in their removal order from the dependency tree while the server device is prioritizing the processing of the requests; and means for removing a selection of requests from the dependency tree wherein the selection is based on the order of requests in the list.

According to a fourth aspect of the invention, there is provided a method of processing requests in a server device, comprising, at the server device, the steps of:

receiving requests from a client device within one connection established with the client device;

receiving priority parameter values, associated with the received requests, indicative of the relative order at which the client device wishes the server device to process the requests;

building a dependency tree between the received requests using the associated priority parameter values for prioritizing the processing of the requests by the server device;

assigning relevance values to the requests of the dependency tree, according to assignment rules, for selecting requests to be removed from the dependency tree, wherein a request that is parent of a plurality of requests in the dependency tree is assigned a relevance value greater than or equal to the highest relevance value previously assigned to one of its descendants; and removing a selection of processed requests from the dependency tree based on the assigned relevance values where requests with lowest relevance values are removed first.

In one implementation, the method further comprises processing the received requests in an order that takes into account the tree of dependencies between the requests.

In one implementation, the method further comprising transmitting to the client device responses resulting from the processing of the requests.

In one implementation, each request is associated with a stream identified by a stream identifier, and wherein a closed stream corresponds to a processed request; thereby requests corresponding to non-closed streams cannot be part of the selection of processed requests to be removed.

In one implementation, the method further comprising selecting a number $Ns=N-Mm$ of processed requests having the lowest relevance values, where N is the number of requests in the dependency tree and Mm is the maximum number of streams that the client can open simultaneously.

In one implementation, the assigning of relevance values comprises:

assigning sequence numbers to the received requests; and updating the sequence numbers according to the assignment rules thereby obtaining the relevance values.

In one implementation, the assigning of relevance values comprises:

assigning reception timestamps to the received requests; and updating the timestamps according to the assignment rules thereby obtaining the relevance values.

In one implementation, if a new request is inserted in the dependency tree between a parent request and the child requests of the parent request, thereby the new request becoming the new parent request of the child requests, the relevance value assigned to the new parent request is higher than the relevance values of the child requests.

In another implementation, if a new request is inserted in the dependency tree as a new child of a parent request, the relevance value assigned to the parent request is updated to be equal to the relevance value of the new child request.

Preferably, the requests and corresponding responses are exchanged between the client device and the server device according to the HTTP protocol.

In one implementation, the building of the dependency tree comprises:

obtaining identifiers of the streams associated with the received requests; and storing in memory the stream identifiers along with priority information linking hierarchically the stream identifiers.

In one implementation, the order of processing the requests is solely based on the built dependency tree.

In another implementation, the order of processing the requests is based on the built dependency tree and additional priority criteria local to the server device.

In one implementation, the assignment rules comprise assigning higher relevance values to more recently created requests.

In one implementation, the assignment rules comprise assigning higher relevance values to more recently used requests.

According to a fifth aspect of the invention, there is provided a method of processing requests in a server device, comprising, at the server device, the steps of:

receiving requests from a client device within one connection established with the client device;

building a dependency tree between the received requests for prioritizing the processing of the requests by the server device;

processing the received requests in an order that takes into account the tree of dependencies between the requests;

deciding on whether to keep in or remove from the dependency tree identifier(s) of one or more already processed requests; and notifying the client device about the result of the deciding.

In one implementation, the method further comprising:

receiving from the client device an indication of first type containing an identifier of a request or of a corresponding stream the client device wishes the service device to keep in the dependency tree.

In one implementation, the method further comprising:

receiving from the client device an indication of second type comprising an identifier of a request or of a corresponding stream the client device wishes the service device to remove from the dependency tree.

In one implementation, the deciding on whether to keep in or remove from the dependency tree one or more identifiers is based on the type of indication received from the client device.

In one implementation, receiving an indication of the first type causes the server device to keep the identifiers contained in the indication in the dependency tree.

In one implementation, receiving an indication of the second type causes the server device to remove the identifiers contained in the indication from the dependency tree.

In one implementation, the client device is notified about only those requests the server device decided to keep or their identifiers in the dependency tree.

In one implementation, the client device is notified about only those requests the server device decided to remove or their identifiers from the dependency tree.

In one implementation, the client device is notified about all requests the server device decided to keep or to remove or their identifiers in or from the dependency tree.

In one implementation, the method further comprising:

receiving priority parameter values, associated with the received requests, indicative of the relative order at which the client device wishes the server device to process the requests;

and wherein the building of the dependency tree between the received requests uses the associated priority parameter values.

In one implementation, the order of processing the requests is solely based on the built dependency tree.

In one implementation, the order of processing the requests is based on the built dependency tree and additional priority criteria local to the server device.

In one implementation, each request is associated with a stream and is identified by the stream identifier.

In one implementation, the building of the dependency tree comprises:

obtaining the identifiers of the streams to which belong the received requests; and storing in memory the stream identifiers along with priority information linking hierarchically the stream identifiers.

In one implementation, the requests and corresponding responses are exchanged between the client device and the server device according to the HTTP protocol.

According to a second aspect of the invention, there is provided a method of processing requests in a client device, comprising, at the client device, the steps of:

sending requests to a server device within one connection established with the server device;

sending an indication to the server device for keeping in or removing from a dependency tree built at the server device, of a request identified by an identifier contained in the indication.

Advantageously, the method further comprising a step of receiving a notification from the server device containing the result of the keeping or of the removing by the server device instructed in the sent indication.

BRIEF DESCRIPTION OF THE DRAWINGS

Embodiments of the invention will now be described, by way of example only, and with reference to the following drawings in which:

FIG. 2b illustrates an implementation example of the flowchart of FIG. 2a;

DETAILED DESCRIPTION OF EMBODIMENTS OF THE INVENTION

In the following description, a dependency tree is typically defined by the requests (streams) identifiers plus necessary priority information linking hierarchically these stream identifiers. In other words, the full contents of the requests (payload data) are not necessarily part of the dependency tree, and thus do not need to be stored in memory.

Thus, when it is stated in the following that a request or a stream is removed from the dependency tree, it is meant to indicate that the corresponding identifier is removed from the tree and that the hierarchical relationship between the remaining requests/streams are updated accordingly.

Furthermore, according to one representation, the dependency tree can be seen as formed of "nodes" or "priority states" representing the streams or the requests. We can thus refer to a root node, branch nodes and/or leaf nodes of the dependency tree. Removing or adding a stream in the tree is thus represented by the removal or the addition of a node or a priority state in that same tree.

The dependency tree may also contain "idle states" (or nodes) representing idle streams or requests. An idle state corresponds to a stream identifier not associated, or not yet associated, with an actual stream or a request from the client. An idle state may transition for example to an "open" state when a HEADERS frame is received including a request from the client. If reference is made either directly or indirectly to the stream identifier of the idle state by the client without associating with it an actual request, e.g. using a PRIORITY frame, that idle state is called a "virtual state".

Idle and virtual nodes allow for the creation of a branch-node in the dependency tree, which enables more flexible expressions of priority.

First Embodiment

Figure 1A:
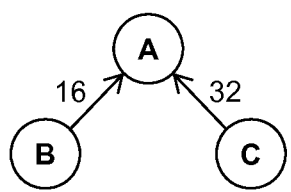
FIGS. 1a-1e illustrate examples of weighted dependency trees for streams constructed by a server or client device.
Figure 1B:
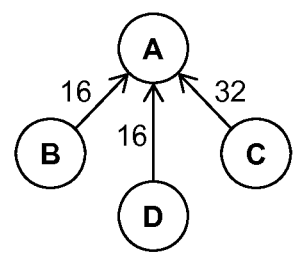
Figure 1C:
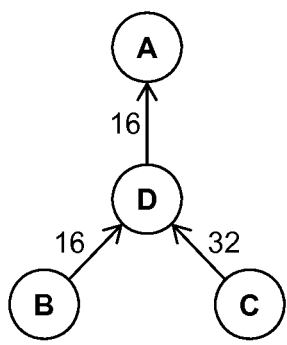
Figure 1D:
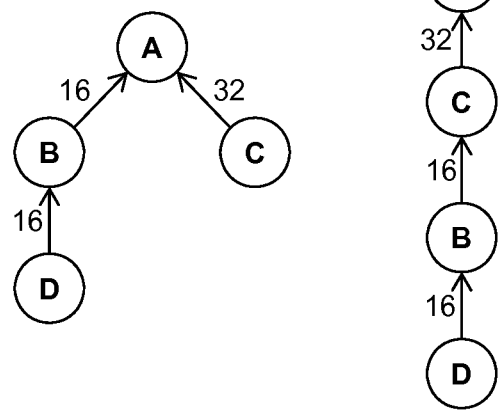
Figure 1E:
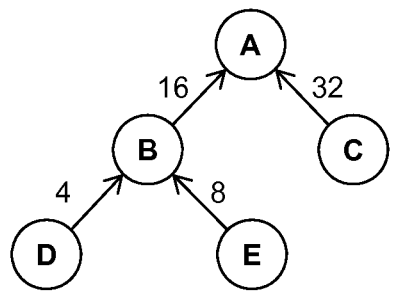
Figure 2A:
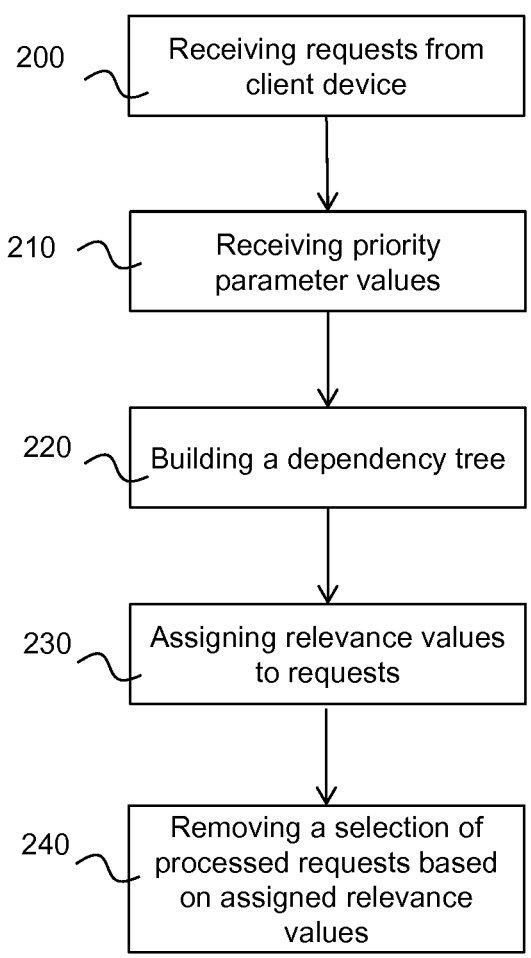
FIG. 2a illustrates a general flowchart executed at the server device for selecting which requests (streams) are to be removed from the dependency tree according to one aspect of the invention.

FIG. 2a illustrates a general flowchart of a priority pruning algorithm executed at the server device for selecting which requests (streams) are to be removed from the dependency tree according to a first embodiment of the invention. The aim of this pruning process is to keep the occupancy of the dependency tree in memory below an acceptable limit, while maintaining good rendering performances at the client device interacting with the server device.

At step 200, requests are received from the client device. All these requests concern one established connection, typically TCP, between the server device and the client device.

At step 210, priority parameter values are further received from the client device. These values are indicative of the relative order at which the client device wishes the server device to process the requests. These priority parameters are transported either within frames used to create a new stream (HEADERS frame) or within a PRIORITY frame as discussed above.

At step 220, a dependency (priority) tree is built using the priority parameter values associated with the received requests for prioritizing the processing of the requests by the server device.

Figure 3A:
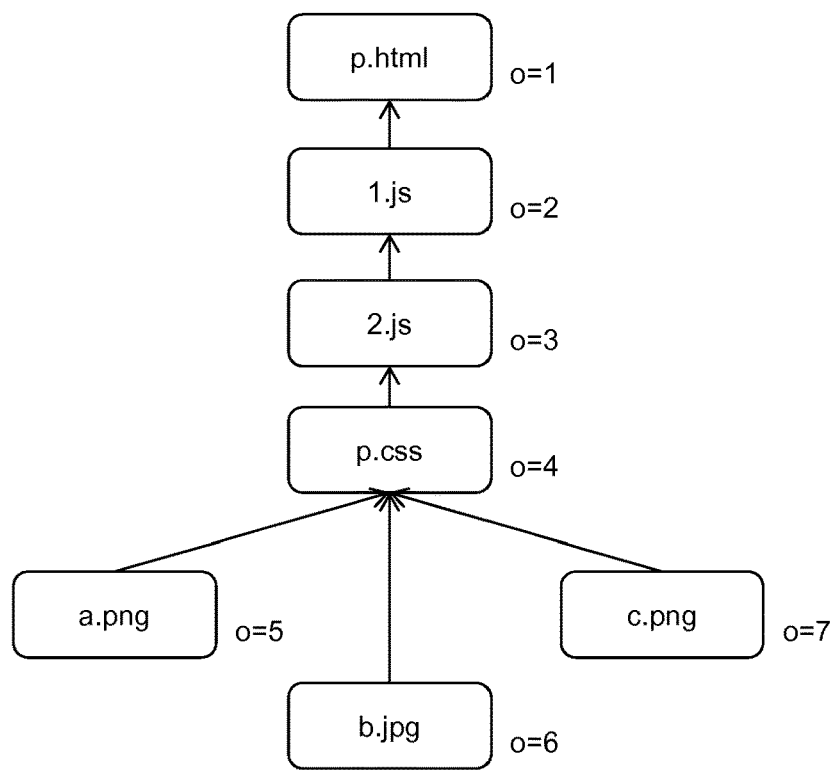
FIGS. 3a-3b show examples of a dependency tree.

FIG. 3a, shows an example of a dependency tree establishing a dependency between the streams of a connection: "p.html", "1.js", "2.js", "p.css", "a.png", "b.jpg" and "c.png". In this example, the dependency between the streams is established in the order of creation of the streams. The creation order ("o") is shown in the figure by integer values (o=1, o=2, etc.). The stream "p.html" corresponds to the root of the tree, "p.css" a branch node or a branch priority state, and "a.png", "b.jpg" and "c.png" leaf nodes or leaf priority states.

Returning back to the description of FIG. 2a, at step 230, relevance values are assigned to the requests of the dependency tree, according to assignment rules, for selecting requests to be removed from the dependency tree.

Relevance values specify the order in which the requests are to be removed from the dependency tree, while the priorities specify the order in which the requests are to be processed. Consequently, requests (or priority states) assigned lower relevance values are removed before requests (or priority states) assigned higher relevance values.

It should be noted that a relevance value can be a single integer (or decimal) value, or a list of integer (or decimal) values.

Details on the rules of assigning the relevance values are provided later in the description.

At step 240, a selection of processed requests (in particular closed streams) is removed from the dependency tree based on their assigned relevance values. Requests with lowest relevance values are removed first.

Figure 2B:
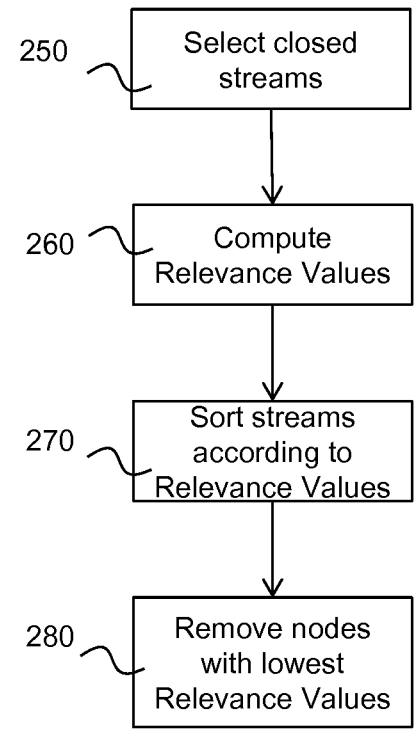

FIG. 2b illustrates an implementation example of the flowchart of FIG. 2a.

First, in step 250, the algorithm selects all streams from the priority tree that are closed.

Then, in step 260, a relevance value is computed for each closed stream.

In step 270, the closed streams are sorted according to their relevance value, thereby forming a sorted list.

It is assumed that the least relevant stream (stream assigned the lowest relevance value) is the first in the list (top of the list), while the most relevant stream (stream assigned the highest relevance value) is the last in the list (end of the list).

It should be noted that steps 260 and 270 can be realized simultaneously, a stream relevance value being computed only when necessary. In addition, some relevance values may already have been computed in a previous execution of the algorithm.

In a preferred implementation of the algorithm, the relevance value is computed for a stream when it is closed. This relevance value is updated each time a modification is made to the priority tree that might change this value.

In the last step, 280, the streams at the top of the sorted list are removed from the priority tree.

In steps 230 of FIG. 2*a* or 260 of FIG. 2*b*, relevance values are assigned according to assignment rules.

A plurality of assignment rules can be used, individually or in any combination, to assign relevance values to the requests (or streams).

As a first general rule, open streams should be kept in the dependency tree. This can be achieved either by excluding non-closed streams from the pool of streams from which it is possible to select streams to be removed (this corresponds to the flowchart of FIG. 2*b* where only closed streams are selected in step 250), or a high (or even maximum) relevance values can be assigned to open streams to guarantee that they will not be selected and thus not be removed from the dependency tree during step 240.

As a second rule, higher relevance values are assigned to more recently created streams or requests. In fact, the client device is likely to use as a parent stream for a dependent stream one of the streams recently created. Therefore, keeping priority information for the most recently created streams makes sense. The created streams can be sorted simply based on their creation order. Alternatively, the creation date (timestamp) could be used. This latter offers more precision when combining several criteria/rules; e.g. a closed stream at a given position in the creation order may be handled differently if it was created just 10 ms before the next created stream or 10s before the next created stream.

In the example of FIG. 3*a*, the creation order is as follows: "p.html", "1.js", "2.js", "p.css", "a.png", "b.jpg" and "c.png".

As a third rule, higher relevance values may be assigned to more recently used streams. In fact, slightly different from the creation order is the priority usage order, i.e. streams are sorted according to the last occurrence of a priority information referring the stream (either as parent or as dependency). Alternatively, and similarly to the sorting of the streams by creation date, the usage date (timestamp) could be used.

As a priority dependency definition refers to a pair of streams parent/child, the two streams may have a same usage date or order. A further criterion may thus be needed to discriminate between the two streams and to assign them different relevance values. The further criterion may be for example:
the creation order of each stream; or
a child stream is ordered before the parent stream, i.e. the child stream is to be removed before the parent stream.

In the example of FIG. 3*a*, the usage order (sorting dependent streams before the parent stream) is as follows: "p.html", "1.js", "2.js", "a.png", "b.jpg", "c.png" and "p.css".

As a fourth rule, higher relevance values may be assigned to more recently closed streams. The closing order, or the closing time (timestamp variant), is another time related criterion. This rule is preferably to be used in combination with another rule as a stream opened for a long time has much less chance to be used by the client as a parent stream for a new dependent stream than a recently created stream. This rule may be useful as a secondary rule: a server may want to keep priority state for some time after closing a stream in order to be able to apply priority changes sent by the client while still not aware that the stream was closed. This also allows the client to send priority updates to take into account the closing of the stream.

The above rules are considered as fully discriminating as they lead at the end to requests with different assigned relevance values. In addition to the above rules, other rules, partially discriminating, may also be considered in preferred implementations. A partially discriminating rule is preferably, but not necessarily, used in combination with a fully discriminating rule. These additional rules allow to (further) modify the relevance values with the aim to retain longer in the dependency tree some specific nodes considered as relatively more relevant.

As a fifth rule, a request that is parent of a plurality of requests in the dependency tree (branch node) is assigned a relevance value greater than or equal to the highest relevance value assigned to one of its descendants.

Note that a branch node is a stream that has at least two depending streams. Possibly, some of the depending streams may be already closed and have had their priority state (node) discarded. For example, in FIG. 3*a*, "p.css" is a branch node.

It is important to note also that the compliance to the rule (and more generally to all rules applied in a given implementation of the invention) needs to be maintained over time. For the fifth rule, this means that if new descendants are attached to the branch of the branch node, the relevance value assigned to the branch node needs to be updated, if necessary, taking into account the relevance value assigned to the new descendants to keep the rule fulfilled.

For example, if a new request is inserted in the dependency tree between a parent request and the child requests of the parent request, thereby the new request becoming the new parent request of the child requests, the relevance value assigned to the new parent request is higher than the relevance values of the child requests.

Also, if a new request is inserted in the dependency tree as a new child of a parent request, the relevance value assigned to the parent request is updated to be equal to the relevance value of the new child request.

As a sixth rule, a request that is a branch root in the dependency tree is assigned a relevance value greater than or equal to the highest relevance value assigned to one of its descendants.

A branch root can be defined in several ways:
it is a stream not depending on any other stream. Optionally, it should have at least one dependent stream;
it is a stream that has at least one sibling and at least one dependent stream;
it is a stream that has a media type corresponding to an html document (or any other type of document referring to other files that are necessary to process it, for example a SVG document using other images);
any combination of the above definitions.

For example, in FIG. 3*a*, "p.html" is a branch root.

In a preferred implementation, the branch root is defined as a stream not depending on any other stream and has at least one dependent stream. In particular, if the response transmitted over that stream is an "html" type document, that branch node is assigned a higher relevancy. In a variant, the branch root is defined as a stream comprising a response of "html" type and which has at least one dependent stream.

As a seventh rule, a stream (request) corresponding to a resource containing links to many other resources is assigned a high relevance value as the stream will probably be used by the client as a future branch node.

The assigned relevance value may be determined as follows: nodes of the dependency tree are assigned initial relevance values by applying at least one other rule, and subsequently the initial values are increased by a predetermined amount for those streams corresponding to resources each containing links to many other resources. Those streams are given higher relevance values than what they initially have been assigned.

In a variant, the assigned relevance value may be set to the highest value for a given duration after the creation of the stream.

In another variant, the assigned relevance value may be set equal or higher than the highest relevance value of its descendants if the stream has at least one descendant.

As an eighth rule, streams for which it is certain or highly probable that they will not have dependent streams are assigned low relevance values (or even lowest), so that they will be removed first.

These streams can be identified based on their type. For example, in the structure depicted by FIG. 3a, streams corresponding to images ("a.png", "b.jpg", and "c.png") don't have any depending streams and it is likely probably that they will not have.

Alternatively, these streams are removed from the dependency tree as soon as they are closed.

Above rules may also apply to idle and virtual states.

For example, second rule may apply by considering that an idle or a virtual state is created when the server receives a HEADERS or a PRIORITY frame referring to an identifier not in sequence with the identifiers of the dependency tree (dermination that one or more identifiers were skipped). The third rule may apply by considering that a virtual state is used when a client refers to the stream corresponding to, or to a stream depending on, that state in a PRIORITY frame.

Additional rules may be added for handling virtual states (nodes).

For example, a virtual node may be assigned a relevance value that is higher to any non-branch node in the dependency tree, thereby a virtual node is not removed before non-branch nodes.

Alternatively, a virtual node may be assigned a relevance value in the range of relevance values assigned (according to any or combination of previous rules) to branch-nodes, thereby making the virtual node of same order of importance than the branch nodes.

Alternatively, a virtual node may be assigned a relevance value higher than those assigned (according to any or combination of previous rules) to the branch-nodes, thereby a virtual node is only removed after all branch nodes are removed.

Alternatively, a virtual node may be assigned the highest relevance value in the dependency tree, thereby it is never removed as long as a minimum number of nodes is maintained, or it is the last to be removed if no minimum number is maintained.

Figure 4:
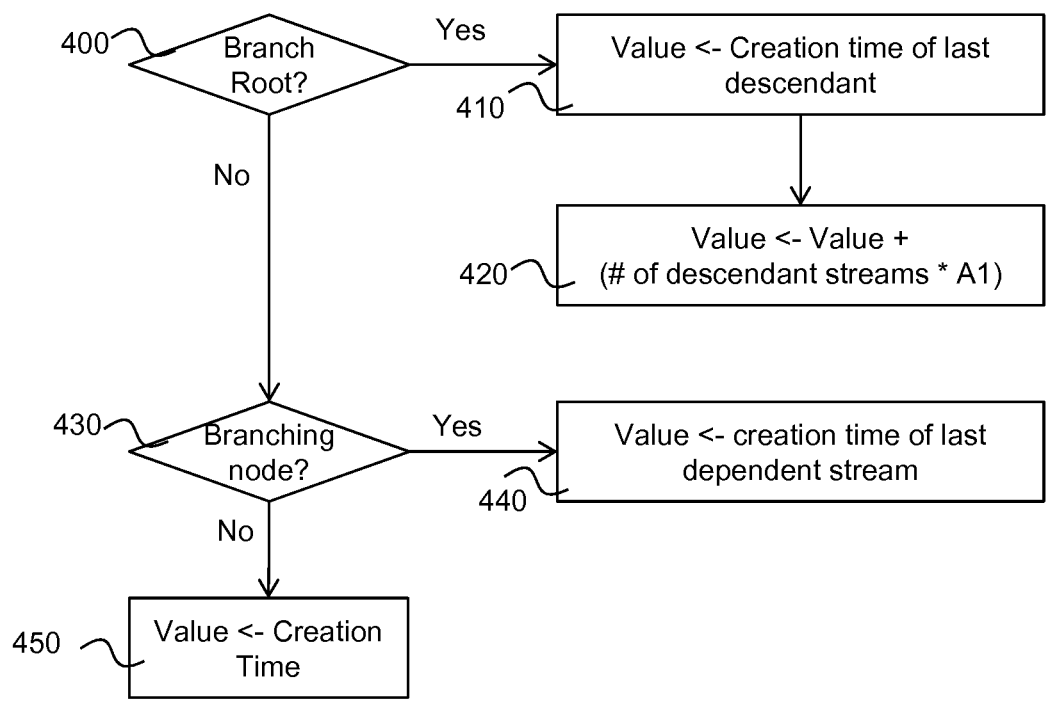
FIG. 4 describes a variant for determining the relevance value for a stream.

FIG. 4 describes another variant for determining the relevance value for a stream using the above discussed rules.

It is first determined (step 400) whether the stream is a branch root (cf. above definitions of branch root).

If it is determined that the stream is a branch root, the relevance value is the creation time of the last descendant of the stream (that is the last created stream that depends directly or indirectly from this root stream) (step 410).

This relevance value is then increased by a predefined amount (A1) for each descendant stream that is not yet closed (step 420). This amount A1 is for example 50 ms per descendant stream (this is computed on the basis that a typical web page has around 100 files, and that it should load in about 5s).

This relevance value may also be increased by a predefined amount A2 if the stream doesn't depend on any other stream and is used to transmit an "html" type document. This amount A2 can be for example 100 ms.

If the stream is not a branch root, it is determined whether the stream is a branch node (step 430). A stream is a branch node if it has (or had) at least two depending streams.

If the stream is a branch node (step 440), the relevance value is the creation time of the last dependent stream.

This relevance value may also be increased by a predefined amount for each dependent stream that is not yet closed. This amount is for example ⅕ of an RTT (i.e. Round Trip Time, defined as the time for a signal to go from the server to the client and back to the server), or 20 ms if the RTT is not known.

If the stream is neither a branch root nor a branch node (step 450), then its relevance value is set to its creation time.

As an alternative, the relevance value of a stream that is neither a branch root nor a branch node is set to its closing time if the closing time is more recent than a predefined value, for example 2 RTT.

Second Embodiment

In steps 240 of FIG. 2a or 280 of FIG. 2b, removal of requests/streams or nodes have been discussed after streams are sorted according to their relevance value. The streams with the highest relevance values are kept, while the other ones are removed.

In a second embodiment of the invention, the priority pruning algorithm is implemented without explicitly assigning relevance values to requests.

In this embodiment, the server maintains a list of requests of the dependency tree in their removal order from the dependency tree and removes a selection of requests based on their order in the list. For example, requests that are first in the list (top of the list) are to be removed before the requests that are at the end of the list. This convention is kept in the remaining of the description for ease of explanation but of course a reverse order can also be envisaged.

Moving requests within the list is thus meant to delay their removal from the dependency tree if they are moved towards the end of the list (moving forward), and to accelerate their removal from the tree if they are moved towards the top of the list (moving backward).

By convention, we assume that moving request A after request B consists into setting the position of request A in the list closer to the end of the list than the position of request B (B will be removed first); i.e. moving "after" should be understood as changing position in the list towards the end of the list.

Note that since the requests are maintained in the list in their order of removal, the position or the index of the request in the list is equivalent to a relevance value as described in the first embodiment. Indeed, if it is assumed that the index increases from the top of the list to the end of the list, requests with high index (located at the end of the list) have high relevance values (to be removed last) while requests with low index values (located at the top of the list) have low relevance values (to be removed first).

Consequently, same rules and criteria (including additional rules for the idle/virtual states) governing the assignment of the relevance values described in the first embodiment can be used in this second embodiment for positioning the requests in the list. It is straightforward to determine that for example assigning a high relevance value to a request translates to setting a position close to the end of the list for that request, and that updating a relevance value of a request A to be higher than the relevance value of a request B translates to moving request A after request B in the list.

Maintaining the list of requests comprises updating the order of the requests based on the predefined rules. For example:
- applying a combination of the second and the sixth rules would consist into ordering the list of requests according to their creation order and moving a branch root (request not depending on any other requests and has at least one descendant, or being of a specific type such as "html") after its descendant(s);
- applying a combination of the second and the fifth rules would consists into ordering the list of requests according to their creation order and moving a branch node after its descendants; and
- applying the seventh rule would consists into moving forward in the list the stream corresponding to a resource containing links to many other resources. For example, this stream could be moved at the end of the list for a given duration after its creation time. It could be also moved after its last child if it has at least one.

Figure 2C:
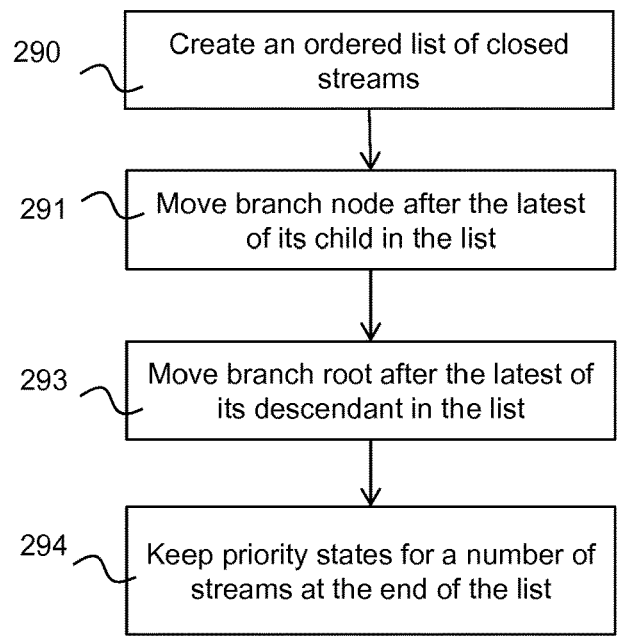
FIG. 2c depicts a flowchart illustrating an implementation example of the priority pruning algorithm executed at the server device in accordance with the second embodiment of the invention.

FIG. 2c depicts a flowchart illustrating an implementation example of the priority pruning algorithm executed at the server device in accordance with the second embodiment of the invention. In this example, the $1^{st}$, $2^{nd}$, $5^{th}$ and $6^{th}$ rules are applied.

At step 290, the server creates a list containing all the closed streams and orders the list according to the streams creation order. The oldest stream is the first in the list, while the newest one is the last (at the end of the list).

At step 291, each closed stream that has at least two children (branch node) is moved after the latest of its child present in the list. Here, "latest" is evaluated relatively to the creation order. In particular, the branch node is moved forward to the position next the position of the latest of its child in the list.

For a given stream, a child is a stream depending directly on it. When counting the number of children for a stream, all its children are taken into account, even those removed from memory (information on the number of children may be obtained from the attributes of the parent node, thus without having to keep track of the streams removed from memory). Streams that were depending on it, but whose dependency was updated by a re-prioritization and are no more depending on the stream are not counted.

At step 293, each closed stream that depends on no other stream and that has at least one descendant (branch root node) is moved after the latest of its descendant in the list.

For a given stream, a descendant is a stream depending directly or indirectly on it. When counting the number of descendants for a stream, all its descendants are taken into account, even those removed from memory. Streams that were descendants of a stream, but whose dependency was updated by a re-prioritization and are no more descendants of the stream are not counted.

At step 294, priority states are kept only for a number of streams located at the end of the list. The number of streams to be kept is discussed in the following of the description.

As discussed above, FIG. 2c illustrates just one example of a pruning algorithm (not explicitly relying on relevance values) and other variants may consider taking into account different rules or combination of rules.

Figure 3B:
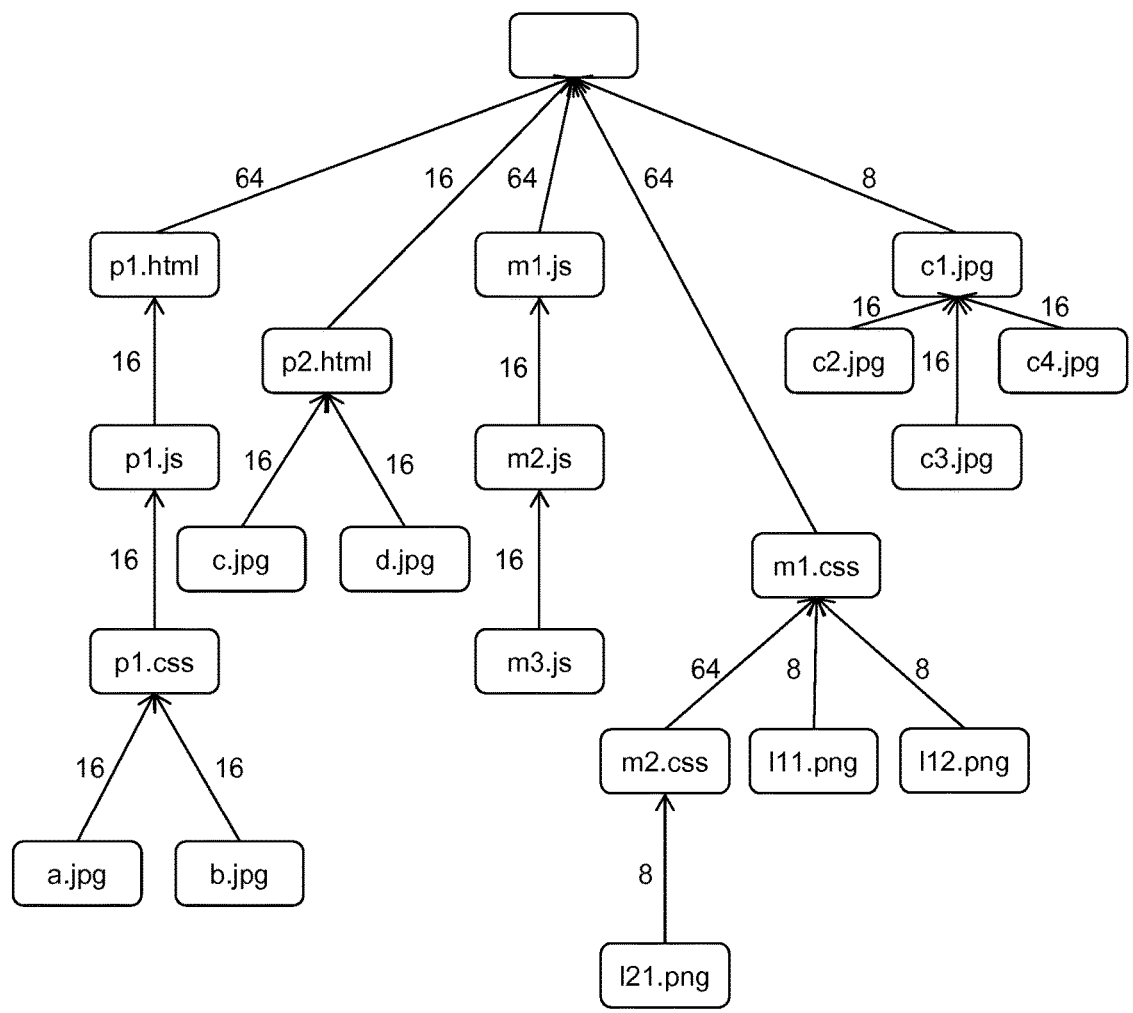

FIG. 3b shows the priority tree for a larger group of requests. These requests correspond to the downloading of two web pages in parallel. The first web page corresponds to the "p1.html" file, and the second web page corresponds to the "p2.html" file. The priority tree contains a branch for each web page, and these two branches are similar to the one shown in FIG. 3a. In addition, the priority tree contains branches for files common to the two web pages. One branch is for JavaScript files, one branch is for css files and their associated resources, and the last branch is for images.

The branch for the first page has a larger weight than the branch for the second page as the first page is in the foreground and should be downloaded faster than the second page.

The branch for JavaScript files is linear, as JavaScript files need to be processed in order by the client. As JavaScript files are important to process a web page before displaying it, the weight of this branch is large. Possibly, some JavaScript files could be less important and could be grouped into their own branch with a lower weight. This could be the case for JavaScript files that are loaded after a web page is displayed to add functionalities to this web page.

The branch for the images is not linear as images are downloaded in parallel. An image that use a progressive encoding can be shown in a low resolution early during its downloading and be refined once more data are available. By downloading images in parallel, each image using a progressive encoding can be shown early in a low quality version. Ideally, all the images should be root nodes. However, to prevent their combined weight to impact the download speed of the other branches, one image (here "c1.jpg") is selected as the root of the branch, and all other images depend on it. The root image ("c1.jpg") will be downloaded first, then all other images are downloaded in parallel. Once in a while, the root image will be replaced by another image to allow the server discarding the priority state of the root image. For example, the priority of "c2.jpg" can be changed so that it depends on "c1.jpg" and has "c3.jpg" and "c4.jpg" as dependent streams.

The branch for the css files is more complex. The css files themselves are organized either as the JavaScript files or as the images. In addition, for each css file, the files it refers to are included in the branch as depending on it. For example, "I11.png" and "I12.png" are images referred to by "m1.css" and depends on it. These files have a lower weight than the css files which is preferably downloaded first. Continuing the example, the weight of "I11.png" is lower than the weight of "m2.css". Possibly, the files could also be organized as the image branch, to not compete too much with the css files. Still in the example, "I11.png" and "I12.png" compete with "m2.css" and "I12.png" could be made dependent on "I11.png" (this would be more meaningful it there were more files referred to by "m1.css").

The example of FIG. 3b shows are more complex example of priority tree and gives some cases where specific handling can occur.

For the branch used to download images, once the client puts a replacement for the image that is the branch root, priority state for the old branch root can be discarded. The server knows that the client has chosen to replace the branch root and will not refer to it any more in priority information. It is also possible for the server to collapse the old and the new branch roots into a single node that can be referred to using both the new and the old identifiers.

For the JavaScript branch, even when all the files have been downloaded, it may be useful to keep the branch root and the branch leaf. This JavaScript branch may be reused in the future for new common JavaScript files to download. The branch root may be referred to in future priority information to change the priority of the whole JavaScript branch. The branch leaf can be used as the parent node of a new JavaScript file to download.

For the same reason, the branch root of the image branch, and the branch root of the css branch should be kept, as well as the last branch node of the css branch.

Information about the served content can also be used to determine when all the common files have been downloaded. For example, if all the common JavaScript files (or all the JavaScript files) present on the server have been downloaded by a client, then the JavaScript branch may be discarded as it will not be reused.

In steps 240 of FIG. 2a, 280 of FIG. 2b (first embodiment) or 294 of FIG. 2c (second embodiment), streams/nodes are removed or kept in consideration of a number of streams defining a limit for the size of the dependency tree (referred to as a tree size).

The number of streams kept may be predefined. It can be for example the maximum number of streams that the client can open simultaneously, or a multiple of this number. It can also be an absolute number.

The server may check if a chosen value for the tree size parameter is appropriate or not. For example, if priority states for recent branch roots or branch nodes are dropped, it may mean that the number of kept streams (tree size) is too small. On the contrary if old normal streams (e.g. not corresponding to branch roots or branch nodes) are kept, it may mean that the number of kept streams is too large.

If the number of kept streams is too small, the server can react in several ways.
- It can increase temporarily the number of kept priority states for the client. This allows handling temporary situation where the client has a high level of communication with the server. This solution can only be used if the server is not under a heavy load, and also only if the need for keeping more priority states is transient.
- It can reduce the amount of priority states necessary to represent some closed streams, thus keeping priority states available for a larger number of closed streams without increasing its memory requirements. For example, in the case of FIG. 3a, once the priority state for the streams "1.js" and "2.js" are dropped, the priority state for the streams "p.html" and "p.css" may be combined: only one node is kept in the priority tree, but this node is labelled as corresponding to both streams.
- It may adapt some parameters in the computation of the relevance value/maintenance of the ordered list to allow keeping priority states for closed streams deemed more important. For example it can increase the relevance value for branch roots and branch nodes to the detriment of normal streams (e.g. non-branch roots and non-branch nodes).
- It may use some heuristics to guess which streams are more likely to be used by the client as parent for new dependent streams. For example, in FIG. 3a, if the server has not received streams "b.jpg" and "c.png", it can't know that "p.css" will be a branch node (stream). If both "p.css" and "a.png" are closed and it needs to remove priority state of one of them, it may choose to keep the priority state for "p.css" rather than for "a.png" using the fact that "p.css" correspond to a css type file and is more probable to be a branch node than "a.png" that is an image file. This assumption relies on the fact that the client is organizing its streams in a tree with the general shape of the priority tree of FIG. 3a.

If the number of kept streams is too large, the server may react in several ways.
- It may take no action as long as it is not under a heavy memory load.
- It may reduce the number of priority state kept.
- It may keep priority state for normal streams for only a predefined duration after their closing time, for example for 2 RTT.

The priority pruning algorithms as described with regards to FIGS. 2a, 2b (first embodiment) and 2c (second embodiment) when executed by the server rely on limited information received from the client. Typically, this information includes the priority parameter values which indicate the relative order at which the client device wishes the server device to process the requests and which are used for building the dependency tree at the server. However the handling of the requests of the dependency tree by the server could be further enhanced if appropriate indications are received from the client or additional information is exchanged between the server and the client.

In one implementation of the pruning algorithms by the server, the rules for assigning the relevance values or ordering requests in the ordered list can also take into account indications from the client.

For example, the client may indicate to the server the streams the client intends to use in the future for prioritizing the processing of new streams. This indication may take several forms:
- it is an indication that the stream will be used in future priority information (parameter), i.e. that the stream will be used in prioritizing future requests/streams;
- it is an indication that the stream will be a branch root or a branch node, or both;
- it contains an indication of the duration during which the client intent to use the stream in prioritizing future requests/streams, or a rough number of future priority information that will use the stream.

The indication can be transmitted to the server in several ways:
- as HTTP headers; or
- inside HTTP/2 frames, for example as a flag in a frame creating the stream or in the frame defining its priority.

In order for the client to set more reliably its priority parameters to be sent to the server, it is advantageous for the client to know which streams the server is keeping in its dependency tree. This can be achieved by making the client execute the same pruning algorithm as the server.

In one implementation, the client device and the server device may run independently the same algorithm for management the dependency tree without exchanging specific synchronization messages. In this implementation, the client has to know the algorithm used by the serve to compute relevance values or to maintain the ordered list of requests, and the number of priority states the server keeps for closed streams. This information can be known through several means:
- the information can be predefined; or
- the information can be based on external configuration;
- the information can result from a negotiation between the client and the server; or the information can be transmitted directly from the server to the client.

In the latter case where the server communicates directly with the client, the server can transmit to the client the algorithm it uses for computing relevance values or for the ordering the list of requests. This may be a choice of algorithm inside a predefined list, or parameter values for configuring a predefined algorithm. For example, the parameters may be identifiers of the rules applied by the server for the assigning of the relevance values or for the maintaining of the ordered list of requests.

In addition, the server can transmit the number of priority states it keeps for closed streams. This number can be an absolute number or a number relative to the maximum number of streams a client can open simultaneously with the server. In this latter case, the number may result from a negotiation between the client and the server as part of the HTTP/2 connection establishment for example.

This server information can be transmitted in several ways:
  inside HTTP headers; or
  inside HTTP/2 frames (that is by extending the HTTP/2 stream syntax to include this information).

In the context of HTTP/2, a setting parameter, referred to herein SETTINGS_PRIORITY_STATES parameter, may be used to inform the client about the tree size; i.e. the number of priority states to be kept for closed streams by the server.

The initial value for this parameter is for example 100. It is recommended that the value for this parameter be at least the same as the value of the SETTINGS_MAX_CONCURRENT_STREAMS parameter, indicating the maximum number of concurrent streams that the client will allow.

In one implementation, the usage of the SETTINGS_PRIORITY_STATES parameter doesn't require any negotiation between the server and the client. Upon sending this setting parameter, a server informs a client that it uses the pruning algorithm described above for selecting for which closed streams priority states are kept.

A client receiving the setting parameter (and understanding it) can choose to take advantage of this parameter to compute the priority state information kept by the server. In this case, the client may send a SETTINGS frame containing the SETTINGS_PRIORITy_STATES parameter to indicate that it understands this parameter, i.e. the client is running a compatible software, and will apply the algorithm for determining which priority states are kept by the server.

Upon receiving this SETTINGS frame, the server knows that the client is using the algorithm to compute the priority states kept by the server. It therefore use the pruning algorithm to select the priority states it is keeping.

Note that a server can update the value of the setting parameter (tree size). When the value is updated by the server and communicated to the client, the server should not apply the new value until it has received an acknowledgement for the communicated setting parameter from the client to ensure that the client and the server stay synchronized.

Communicating to the client the setting parameter and informing the client about the implementing of the pruning algorithm enables the client to have a good knowledge of the closed streams for which priority information is kept by the server. Using this information, the client can define priorities knowing reliably that the server will be able to apply them.

In the above example, a setting parameter is set by the server and communicated to the client to indicate the number of priority states to be kept for closed streams by the server. Other variants may be envisaged such as a client device sending a setting parameter to the server for indicating the number of priority states to be kept for closed streams by the server or by the client.

Figure 5A:
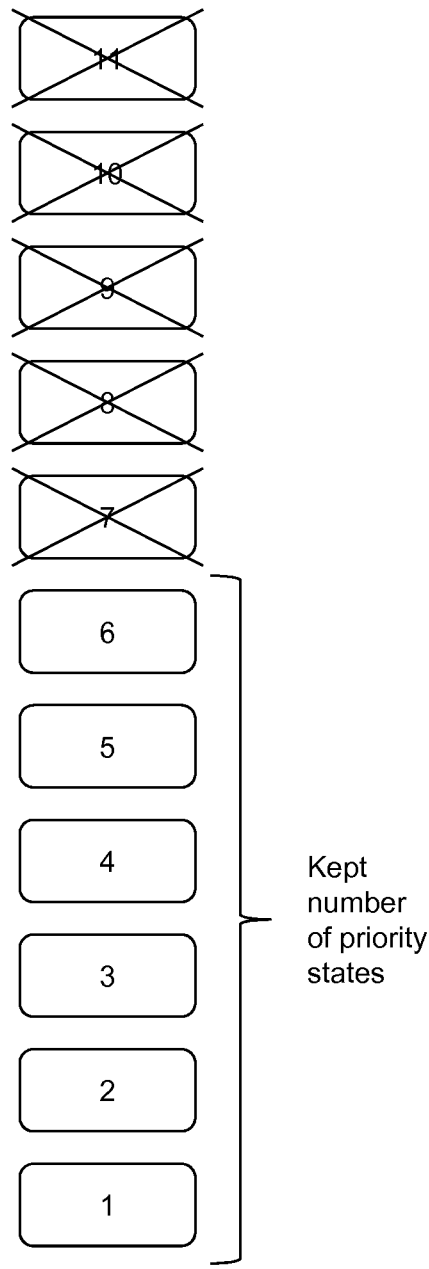
FIGS. 5a-5b show examples of a list of streams as sorted by the client device.
Figure 5B:
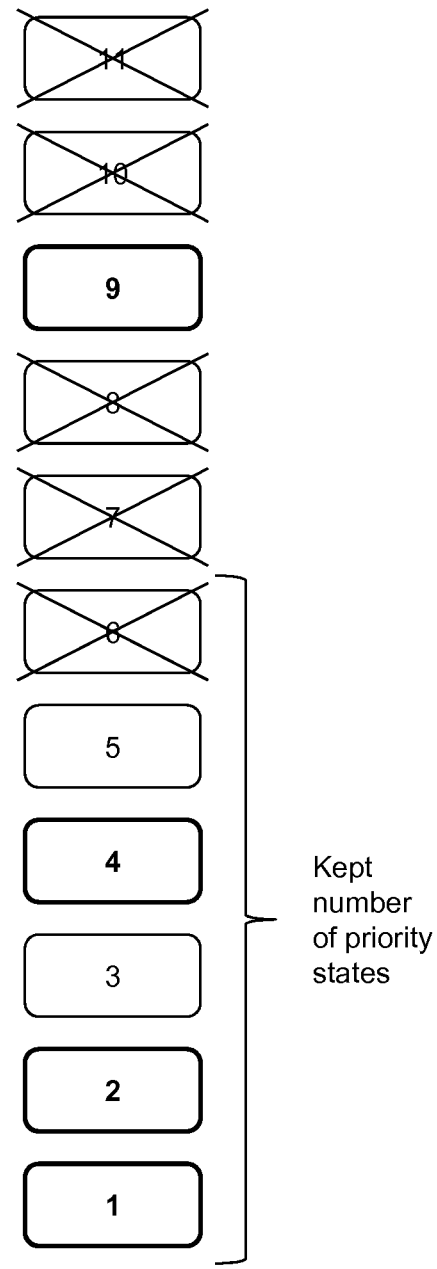

FIGS. 5a-5b show examples of a list of streams as sorted by the client device that runs the same pruning algorithm as the server device.

If the server has provisions for keeping priority state information for a minimum amount of time after a stream closure, then the client sorts all the closed streams with the server algorithm.

This results in an ordered list as shown on FIG. 5a. Knowing the number Nc of kept priority states for closed streams (e.g. SETTINGS_PRIORITY_STATES parameter), the client can know for which closed streams the server is keeping priority state information. In FIG. 5a, this number Nc is 6 (this is a very low number, only for illustration purpose), and the client knows that the server is keeping priority state information for the streams 1 to 6. It also knows that the server has discarded priority state information for the streams 7 to 11.

In addition, the client knows that the server is keeping priority state information for the not yet closed streams from the client point of view. This means that the streams may have been closed by the server, but that the closing signal is being transmitted and the client hasn't received it yet.

If the server has no provisions for keeping priority state information for a minimum amount of time after a stream closure, then the client sorts all the streams, including the non-closed ones, with the server algorithm.

This results in an ordered list as shown on FIG. 5b. In this list, open streams are shown in bold (1, 2, 4 and 9). Knowing the number N of kept priority states for all streams (6 in the example of FIG. 5b), the client can know for which streams the server is keeping priority state information. The server is keeping priority state information for all open streams (these are stream 1, 2, 4 and 9). Knowing the number O of open streams, the client knows the number Nc of kept priority states for closed streams: Nc=N−O.

This allows the client to know for which closed streams the server is keeping priority state: streams 3 and 5.

As there is no provision for keeping priority state information for a minimum amount of time after a stream closure, the client should not rely on open streams that are not in the first N streams in the ordered list. In the case of FIG. 5b, this is stream 9. For these streams, the priority state information may be discarded at any time once the stream is closed.

In one implementation discussed above, the client sends indications to the server about the streams the client intends to use in prioritizing future streams.

In another implementation, the client may request in addition to, or instead of, the above indications, the server to keep certain streams/nodes in the dependency tree of the server. The client notifies thus its wishes to the server about the streams to keep in the tree. The client may also notify the server about the streams that the client no longer needs to keep in the dependency tree of the server.

Figure 10A:
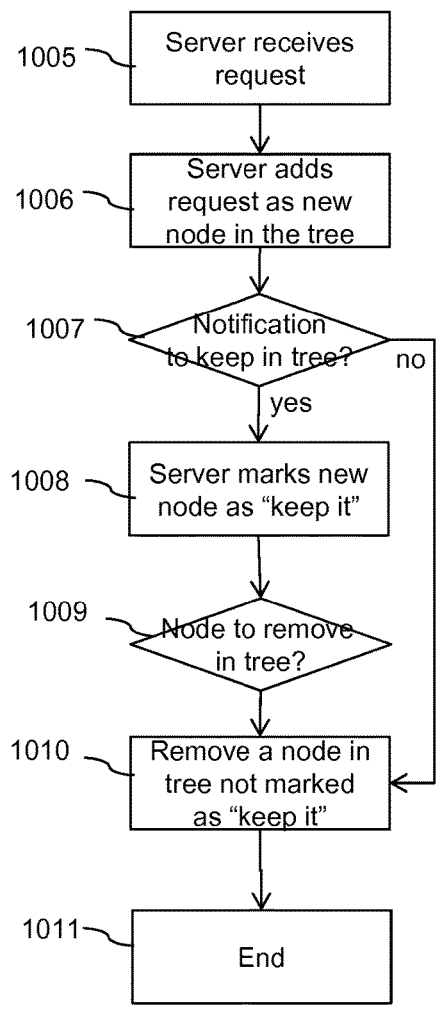
FIGS. 10a and 10b depict flowcharts executed respectively by a server device and a client device according to an embodiment of the invention.
Figure 10B:
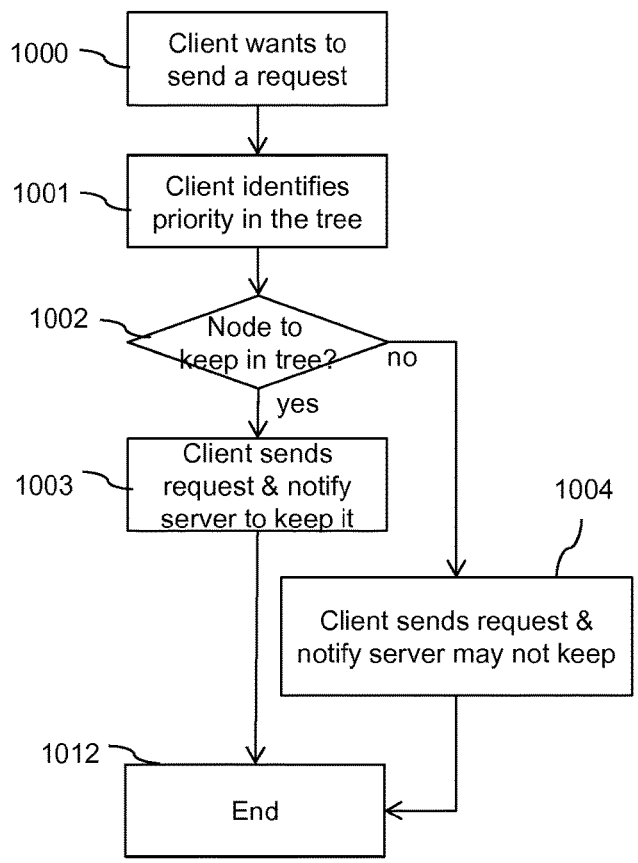

FIGS. 10a and 10b depict flowcharts executed respectively by a server device and a client device according to an embodiment of the invention. These flowcharts illustrate the notifications sent by the client to the server to keep requests in the dependency tree Referring to FIG. 10b, first the client wants to send a request (step 1000) to the server, for instance based on orders from a web application. The client identifies the importance of the request in the tree (step 1001), i.e. whether it should be kept in the priority tree for future use. This identification may be similar to the heuristics presented in FIG. 6. It may be done based on the expected content type or based on additional metadata. For instance, the request may be sent to retrieve a sub-resource of an HTML document. The HTML document may identify that the sub-resource may contain a lot of sub-resources, in which case it may be useful to keep it in the tree (e.g. seventh rule). This identification may be done after sending the request, or as illustrated in FIG. 10b at the time of sending the request. If the node is to be kept (step 1002), the client sends the request and will notify the server to keep it. The notification to keep it may be part of the request or may be sent separately (using the PRIORITY_RETENTION frame for instance that will be discussed later). Otherwise, the client sends the request and may notify that the request may not be kept in the tree once completed (step 1004). This notification may also be implicit: any request that is not marked as to keep may be interpreted by default as "not to keep" by the server. Then the process ends at the client side (step 1012).

Once the request is sent at the client side, the server will receive it (step 1005). The server will add the request as a new node in the tree based on its priority (step 1006). If the server receives a notification that it should be kept in the tree (step 1007), the server will store that information in the tree (step 1008). The server may then check whether its tree becomes too large (step 1009). If a node should be removed, the server will remove a node marked as "not to keep" (1010) and the process will end (step 1011).

The algorithm may be completed with the subsequent possibility for the client to change nodes marked as "to keep" to nodes marked as "not to keep".

In the context of HTTP/2, a new frame PRIORITY_RETENTION may be defined to transport the indication of the client and that allows the client to request the server to keep the priority state for a stream for some time after the stream is closed.

This frame can also be used by the client to indicate that it no longer needs the server to keep the priority state corresponding to a stream.

Optionally, the server can answer that it will keep the priority state by sending this same frame. It can refuse keeping the priority state by sending the same frame with a different payload (signaling).

In a preferred implementation, the information contained in the PRIORITY_RETENTION frame is taken into account in the rules for assigning the relevance values or ordering requests in the ordered list. For example, if the indication contains a request to keep a priority state (and this is accepted by the server), the corresponding stream is moved forward in or at the end of the ordered list (or that stream is assigned a high/highest relevance value). If the frame is used by the client to indicate that it no longer needs the server to keep the priority state corresponding to a stream, this information can also be used to move backward the stream in the ordered list (or to reduce the relevance value or set to its lowest value) if the request is taken into account by the server. In this latter case, the stream can also be removed from the dependency tree.

The PRIORITY_RETENTION frame can be added as a non-critical extension to HTTP/2. Client or server that does not support this frame can safely ignore it.

A client or a server device that supports receiving the PRIORITY_RETENTION frame from a peer device can announce it by sending a PRIORITY_RETENTION frame on stream 0.

As an alternative, for a better possibility of negotiation, a client or a server willing to support the reception of the PRIORITY_RETENTION frame from a peer device should announce it in one of the following ways:

it can send a PRIORITY_RETENTION frame on stream 0.

it can send a PRIORITY_RETENTION frame as a reply to another PRIORITY_RETENTION frame sent by its peer.

In this alternative, the announcement for supporting receiving a PRIORITY_RETENTION may be only valid for the duration of the connection. This announcement is preferably done at the latest in reply to the first PRIORITY_RETENTION frame sent by the peer device.

The PRIORITY_RETENTION frame may contain:
a payload field,
a 1-bit field indicating the retention status of priority information for the stream. The value 1 means that the priority state for the stream is retained. The value 0 means that the priority state for the stream is not retained.

The value of this field is set to 0 when the PRIORITY_RETENTION frame is sent on stream 0.

As an option, to allow the client or the server to acknowledge PRIORITY_RETENTION frames sent by a peer device (the server or the client), the PRIORITY_RETENTION frame defines a flag ACK, which value is set to 1 to indicate that the frame is an acknowledgement of another PRIORITY_RETENTION frame received by the endpoint.

A server or a client can request its peer to retain priority information for a stream by sending a PRIORITY_RETENTION frame with the F field set to the value of 1 on this stream.

This priority retention request asks the peer to keep enough priority state for the stream to be able to correctly interpret further priority information send by the endpoint (server or client) using this stream as the stream dependency for another stream.

An endpoint (server or client) can inform its peer that it no longer needs or plans to retain priority information for a stream by sending a PRIORITY_RETENTION frame with the F field set to the value of 0 on this stream.

This priority release indication tells the peer that the endpoint is no longer interested in using the stream as the stream dependency for another stream.

An endpoint preferably sends a priority release indication only for a stream for which it has previously sent a priority retention request. Similarly, after sending a priority retention request for a stream, an endpoint preferably sends a priority release indication for it.

The recommended usage of the PRIORITY_RETENTION frame for a stream is to first request the peer to keep priority state for this stream, and then, when this stream is no longer useful for defining new priorities, to inform the peer it can delete the kept priority state.

As an option, to allow an endpoint to acknowledge PRIORITY_RETENTION frames sent by a peer, the PRIORITY_RETENTION frame defines the following flags:

ACK (0x1): Bit 1 being set indicates that the frame is an acknowledgement of another PRIORITY_RETENTION frame received by the endpoint.

An endpoint that has announced support for receiving PRIORITY_RETENTION frames, and that receives a priority retention request for a stream may either:

Honor the request and keep priority state for this stream.
Refuse the request by sending a PRIORITY_RETENTION frame on the same stream with the F field value set to 0 and the ACK flag set.

An endpoint may preferably send a PRIORITY_RETENTION frame on a stream with the ACK flag set only in two cases:

To announce its support for receiving PRIORITY_RE-
TENTION frames.

To refuse a priority retention request.

As an option, the PRIORITY_RETENTION frame can specify the expected duration for which the peer will retain the frame.

The PRIORITY_RETENTION frame can include a field giving the expected retention duration in milliseconds. This field could be from 16 to 20 bits, allowing expressing durations up to 65 to 1000 seconds.

The PRIORITY_RETENTION frame can also include a field giving the expected number of stream creations for which the priority state is expected to be retained by the peer. This field could be from 8 to 16 bits. This number could also represent the expected number of streams created as depending on the stream.

In all these usages, the retention of the priority state of the stream can be increased by sending a new PRIORITY_RE-TENTION frame on the stream. This allows the endpoint to make a first evaluation of the needed retention duration, and to further extend it if needed.

As an alternative, the PRIORITY_RETENTION can be used by an endpoint to inform its peer on which priority states it intends to keep.

The endpoint could send a first PRIORITY_RETEN-TION frame on a stream to convey its intent on keeping priority state for this stream. Later on, it could send a second frame on the stream to indicate that it is no more keeping priority state for this stream.

The endpoint could also send only one PRIORITY_RE-TENTION frame on a stream, containing an indication of the expected duration of retention for the priority state of the stream.

The PRIORITY_RETENTION frame can be combined with the pruning algorithm described in first and second embodiments. In the pruning algorithm of FIG. 2c, a new step is added before step 294, where all the retained priority states are moved at the end of the list, without changing their respective order (similar step can be added before step 280 of FIG. 2b consisting into adding an offset value to relevance values of all retained priority states to be at the maximum of the relevance values).

A retained priority state is one for which a PRIORI-TY_RETENTION (with the F field set to the value of 1) has been sent on the corresponding stream. Once a PRIORI-TY_RETENTION with the F field set to the value of 0 is sent on the stream, or if the retention duration expires, the priority state for the stream is no more retained.

An endpoint can inform its peer that it has received too many PRIORITY_RETENTION frames indicating that priority states need to be retained for specific streams.

It can send a PRIORITY_RETENTION frame on a specific stream with the ACK flag set and the F field set to the value of 0. This notifies its peer that the PRIORITY_RE-TENTION frame received on this stream will not be taken into account.

A new 1-bit field, E, can be defined inside the payload of the PRIORITY_RETENTION frame, using one of the bits of the R field. Sending a PRIORITY_RETENTION frame on stream 0 with this E field set to the value of 1 notifies the peer that too many PRIORITY_RETENTION frames have been received.

The above extension based on the PRIORITY_RETEN-TION frame enables the client to ask the server to retain some specific priority information. As such, the client has a good control over the priority tree of the server and can use many possible strategies for organizing the shape of the priority tree.

The client is preferably limited in order not to ask the server to retain a too large number of streams, otherwise the memory consumption on the server side would be too large.

In one implementation, when the server is not able to apply a priority sent by the client, the server fails silently.

In an alternate implementation, when the server is not able to apply a priority sent by the client, the server could send feedback to the client to mitigate the consequences of this failure.

For example, the server can send feedback to the client when a priority for a stream cannot be applied because it refers to a parent stream for which the server has no more priority state (e.g. already removed). This allows the client to send new priority information for the stream to correct the default behaviour of the server.

Figure 9:
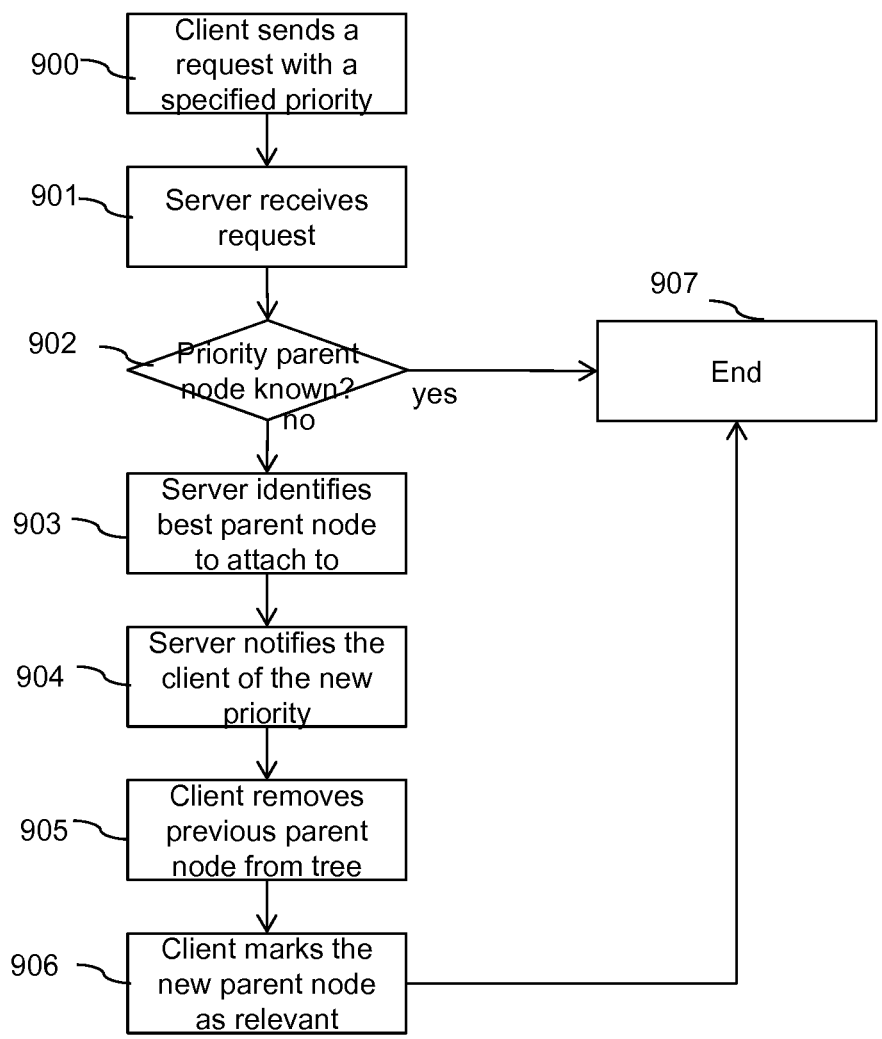
FIG. 9 illustrates on example of interactions between the client and the server for handing streams no more present in the dependency tree.

FIG. 9 illustrates on example of interactions between the client and the server for handing streams no more present in the dependency tree.

The process starts by the client sending a request with a specified priority (step 900). The client may select the more relevant node in its tree to define the relative priority. Otherwise, it may only select nodes with a sufficiently high relevancy criterion, as defined in FIGS. 6 and 7, so that the probability that the server discards the node is low.

The server receives the request (step 901). In the case the parent node of the priority is known from the server (step 902), the server and client will process as usual the corresponding request and response, and the process ends (907).

Figure 6:
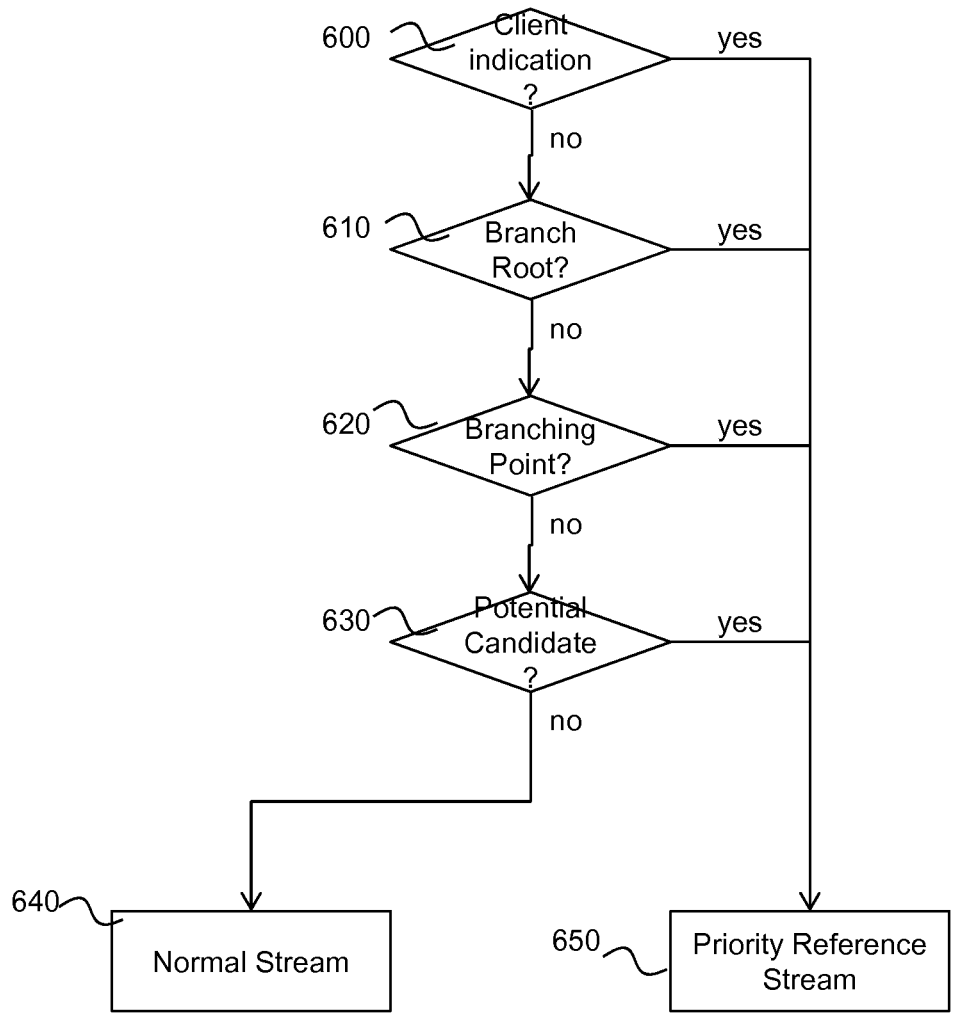
FIG. 6 describes an example of flowchart used by the server to decide for which streams priority state is to be kept for a longer time.
Figure 7:
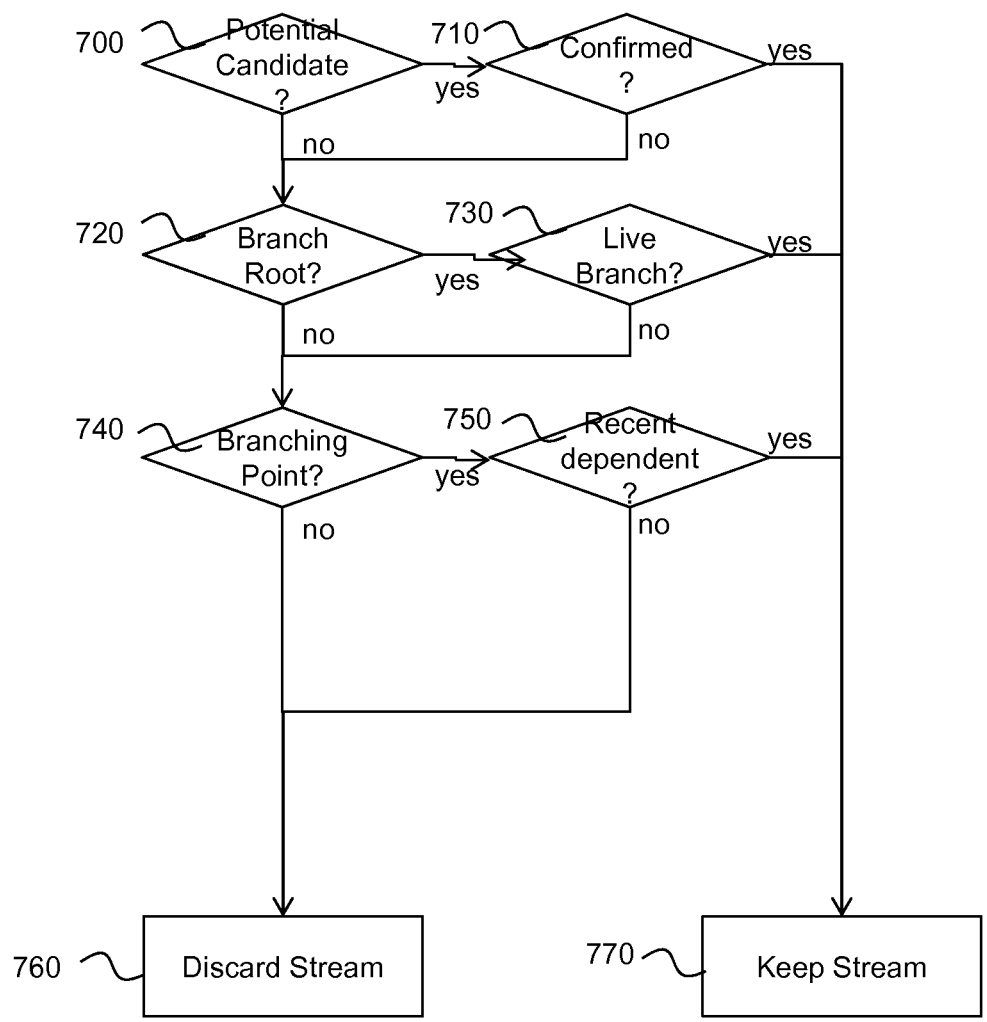
FIG. 7 describes an example of flowchart used by the server to decide if the priority state of a stream can be discarded.

The parent node of the priority may not be known, as the server prunes some nodes using for example heuristics such as defined in FIGS. 6 and 7. In that case, the server will identify the best parent node to attach the node corresponding to the request (step 903). The server may use the process by default (insertion as direct child to the root node). It may also use heuristics to attach the request in more meaningful places. For instance, it may insert an image request close to other existing image requests being processed. Once this is done, the may notify the client of the new priority (step 904).

The server may not send this feedback every time: if the expected duration of the stream is small, and if the stream has no dependent streams, quite possibly the stream will be closed before the client may react to the feedback. As such, the server checks, based on the response size and the number of dependency of the stream whether some feedback should be sent.

Based on that feedback, the client may update its own tree (step 905): the client may remove the missing parent node from its tree so that it will not be reused in future requests. The client may also change how it defines priorities to increase the probability of using the new parent node as a reference (step 906), this parent node having more probabilities to remain in the server tree.

The process may stop there (step 907). In a variant, the client may decide to act upon this feedback. If the fall-back priority applied by the server is close to the priority expected by the client, or just because the client finds the applied priority acceptable, the client will not send new information for that stream. In the contrary, if the client finds the applied priority not acceptable, the client may send new priority information for the The server feedback may be transmitted in several ways:
inside HTTP headers; or
inside HTTP/2 frames.

In the context of HTTP/2, the server may use a PRIORITY frame to inform the client that a priority has not been applied: a client receiving a PRIORITY frame from the server for a stream for which a priority was specified will understand that the priority has not be applied and act as described above. The PRIORITY frame will also include the fallback priority used by the server.

In the context of HTTP/2, a new frame UNAPPLIED_PRIORITY may also be defined to allow the server to inform the client that a priority has not been applied.

The UNAPPLIED_PRIORITY HTTP/2 frame allows the server to inform the client that the priority it received was not applied. The UNAPPLIED_PRIORITY frame is sent on the stream for which the priority was not applied.

The UNAPPLIED_PRIORITY frame is a non-critical extension to HTTP/2. Devices that do not support this frame can safely ignore it.

The UNAPPLIED_PRIORITY frame has no payload.

The UNAPPLIED_PRIORITY frame does not define any flags.

A server receiving a PRIORITY frame or a HEADERS frame containing a Stream Dependency field referring to a stream for which it has not retained any priority state may send an UNAPPLIED_PRIORITY frame to the client to inform it that it will not take into account the priority information it has received. The UNAPPLIED_PRIORITY frame is sent on the stream on which the PRIORITY frame or the HEADERS frame was received.

UNAPPLIED_PRIORITY frames are associated with a stream in a preferred implementation. If a UNAPPLIED_PRIORITY frame with a stream identifier field of 0x0 is received, the recipient responds with a connection error of type PROTOCOL_ERROR.

The UNAPPLIED_PRIORITY frame could be extended with a payload containing a stream identifier. When sending an UNAPPLIED_PRIORITY frame, the server could include a stream identifier to indicate another stream for which it has kept priority information. The client could use this other stream to define a new priority in place of the not applied priority. The server may indicate a stream in the UNAPPLIED_PRIORITY frame only if it expects to keep priority information for this stream for some time: at least a RTT, so that the client could receive the UNAPPLIED_PRIORITY frame and send a new PRIORITY frame with the indicated stream. The server should try to indicate a stream related to the stream referred by the original priority information. This however means that the server is keeping some lightweight priority information for many streams.

The above extension based on the UNAPPLIED_PRIORITY frame provides a lightweight way for the server to inform the client when it cannot apply a priority sent for a stream.

According to an embodiment of the invention, the server device may have two kinds of behavior for keeping priority states for closed streams.

By default, this priority state is kept for a predefined amount of time after the closure of the stream. For example, this priority state is kept of 2 RTT, or 200 ms if the RTT time is not known.

However, for some particular stream referred to as "priority reference streams", the priority state is kept for a longer time. This longer time may be predefined, for example 10 RTT or 1s, or be even higher, up to the order of 100 RTT or 10s. Preferably, the duration for which this priority state is kept may depend on the stream (more details provided below).

As an alternative, the duration for which the priority state is kept is dynamic, and the server will inform the client before discarding (removing) it.

FIG. 6 describes an example of flowchart used by the server to decide for which streams priority state is to be kept for a longer time. The same process can be applied to clients that want to know which nodes have high probability to be kept by servers. This way, clients may reduce the risk to send priority definitions that are not interpretable by servers. A client may typically select a node that is either recent or that can be labelled as a priority reference stream.

The server first tests (600) whether it has received an indication from the client on whether priority state for this stream should be kept. When applying this process on the client-side, the indication may come from the application that calls the client to make a request, for instance based on metadata. If this is the case, then this stream is tagged as a priority reference stream (650). For these streams, the priority state keeping duration is determined as follows:
   if the server is able to detect that the stream is a branch root or a branch point, then the keeping duration is computed as for a branch root or a branch point;
   otherwise, the client duration is set to an intermediate value, for example 20 RTT or 2s. This duration can be updated later once the server is able to detect whether the stream is a branch root or a branch point.

If the previous test is negative, the server tests (610) whether the stream is a branch root. If this is the case, then this stream is a priority reference stream (650). Its priority state keeping duration is determined as follows.

The server estimates the necessary time for transmitting all the files linked to this stream. For example, for the "p.html" stream of FIG. 3a, these files are "1.js", "2.js", "p.css", "a.png", "b.jpg", and "c.png". The list of these files and the transmission time can be obtained from statistics on previous connections from other clients, and on bandwidth estimation for the current client. The list of these files can also be computed from the response corresponding to the stream. The transmission time is then evaluated based on this list, and on a bandwidth estimation for the current client.

The keeping duration is set to this estimated transmission duration.

Alternatively, the keeping duration is set to a large duration, for example 100 RTT or 10s.

If the previous test is negative, the server tests (620) whether the stream is a branch point. If this is the case, then this stream is a priority reference stream (650). Its priority state keeping duration is determined as follows.

The server estimates the time necessary for the client to send all the requests that will depend on this stream. This estimation takes into account:
   the expected number of streams that will depend on this stream. This number can be obtained from usage statistics from previous connections of other clients. It can also be obtained by an analysis of the set of files being transmitted linked to this stream. For example in the case of FIG. 3a, "p.css" is a branch point. This stream is being transmitted as part of downloading the "p.html" file and all its associated files. The server, by analyzing "p.html" and its associated files can find that "p.css" will have three dependent streams: "a.png", "b.jpg", and "c.png";
   the expected time necessary for the client to transmit these requests. This expected time is mainly dependent on the characteristics of the TCP connection between the client and the server. It can also depend on the maximum number of streams that the client can simultaneously open;

A preferred implementation is to use an average estimation for all the branch points:
if the maximum number of streams the client can simultaneously open is at least 100, then this value is not considered a limitation, and a branch point priority state will be kept 5 RTT, or 500 ms.
otherwise, the client may need to wait for some streams to be closed before being able to send all the requests it wants. In such a case, the branch point priority state will be kept 2s.

If the previous test is negative, the server may test (630) whether the stream is potentially a branch root or a branch point. This is useful, for example for the stream "p.html" in the case of FIG. 3a: as the client doesn't know which files are needed in addition of "p.html" before parsing "p.html", the server may finish sending this file and close the stream before the client makes any request for streams depending on "p.html". If the server can guess that "p.html" is the branch root of a future branch, it can consider the stream as a priority reference stream.

The server can use several heuristic for the test 630:
t can use the media type of the response. For example, the fact that "p.html" is an html file suggests that it will be a branch root;
it can use knowledge on how a client organizes its priority tree. With the organization shown in FIG. 3a, css streams can be expected to be a branch point (but this may not always be the case);
it can use statistics on previous priority trees built by clients. This allows the server to know that when downloading "p.html" and all its associated files, clients use "p.css" as a branch point.

A potential branch root or branch point is a priority reference stream (650). Its priority state keeping duration is based on the duration for branch roots and branch points. It can either be the same value, or a reduced value to take into account that the server guess may be wrong.

If the previous test is negative, then the stream is a normal stream and not a priority reference stream and its priority state keeping duration is the default one.

FIG. 7 describes an example of flowchart used by the server to decide that the priority state of a stream can be discarded. This algorithm may also be used client-side for clients that either want to reduce memory consumption or that want to increase the probability to keep nodes also kept on the server-side.

This algorithm can be used in two occasions:
the server is using dynamic priority state keeping durations. In this case, the algorithm is run regularly to determine for which streams the keeping duration should be ended;
the server is using predefined priority state keeping durations. In this case, the algorithm may be run from time to time to determine if some of these durations should be reduced. This can be useful if the number of kept priority state becomes too important.

First the algorithm tests whether the stream was marked as a potential candidate (700). If this is the case, then the server verifies that its assumption was correct (710). For a branch root, this means that the stream has now one or more depending streams. For a branch point, this means that the stream has now two or more depending streams. This verification is only realized if the stream has been created for some time, to allow enough time for the creation of the depending streams. For example, for a branch root this duration is 5 RTT, to allow for the client to receive the response transmitted on the stream, to parse it and to send new stream creation requests. For a branch point, this duration may be shorter, for example 2 RTT, to allow for the client the time to transmit new stream creation requests.

If the assumption was correct, the stream is kept as a priority reference stream (770).

If any of the precedent tests is false, the algorithm tests whether the stream was a branch root (720). If this is the case, it tests whether the branch is alive (730). A branch is considered alive if it has at least one open stream, or if the last stream created on it was created recently, for example less than 2 RTT previously.

If the branch is alive, the stream is kept as a priority reference stream (770).

If any of the precedent tests is false, the algorithm tests whether the stream was a branch point (740). If this is the case, it tests whether the branch point has been added dependent streams recently (740). This is realized by obtaining the creation time of the last added dependent stream, and verifying that it is sufficiently recent. For example, it should have occurred less than 2 RTT previously.

If the branch point has recent dependent, the stream is kept as a priority reference stream (770).

Otherwise, the stream is not kept as a priority reference stream (780).

As an alternative, the server may also check that a client indication is correct. This check is similar to the check for a potential candidate. The minimum delay for doing this check can be higher than the minimum delay for a potential candidate: the client has fewer reasons to make an error than the server.

If the client indicated whether the stream is a branch root or a branch point, or if the server was able to guess it, the server can apply the corresponding checks (730 or 750). Otherwise, the server can apply the check for branch roots.

The client can send an indication to the server that a stream should be a priority reference stream. This indication can consist of only a flag or can also indicate whether the stream is a branch root or a branch point.

Preferably, this indication is transmitted as a flag or a few bits of information inside an HTTP/2 frame (that is by extending the HTTP/2 stream syntax to include this information).

Possibly this indication is transmitted as an HTTP header.

The server can send several type of information to a client:
a stream is a priority reference stream. Possibly with its priority state keeping duration;
a stream is no more a priority reference stream.
a client indication was refused.

This information can be transmitted inside an HTTP/2 frame, or as an HTTP header.

HTTP/2 offers the possibility for the server to transmit unsolicited data. To do that, the server sends a PUSH_PROMISE frame that contains the data of a request. The server can then later on send the response to that request. The server may start transmission of the response just after the PUSH_PROMISE. It will thus integrate the corresponding identifier within the priority tree. This may in turn cause removal of some other identifiers which the client may not be aware of. The server has preferably to define its strategy for handling removals due to pushed data. A simple strategy consists in limiting the number of pushed data so that no identifier removal happens. The server may also remove identifiers of pushed data as soon as the data is transmitted.

In the case the server detects that the client is linking requests against unknown identifiers (probably removed), i.e. trying to create dependencies with identifiers unknown to the server (e.g. because the server has already removed them from the tree), this probably means that the client and server have no more a synchronized tree. In this situation, the server may decide to reset the priority tree, by removing all stored identifiers except ongoing transfer; typically still open streams. In a variant, the server may decide to reset the priority tree only after receiving a given number of unlinked requests over a given period of time.

Preferably, the server device notifies the client device prior resetting the priority tree.

The server may also provide the possibility for the client to have some control on the algorithm executed by the server to remove streams from the dependency tree (eviction algorithm).

In particular, the client may send an indication as part of a request, stating that this request identifier should be kept. The algorithm may then store this information and keep as much as possible this identifier in the dependency tree.

In a variant, the client may send an indication to the server containing the identifier of the request or stream that can be removed from the dependency tree because for example it's no longer be used in the future for attaching dependent streams.

Figure 8:
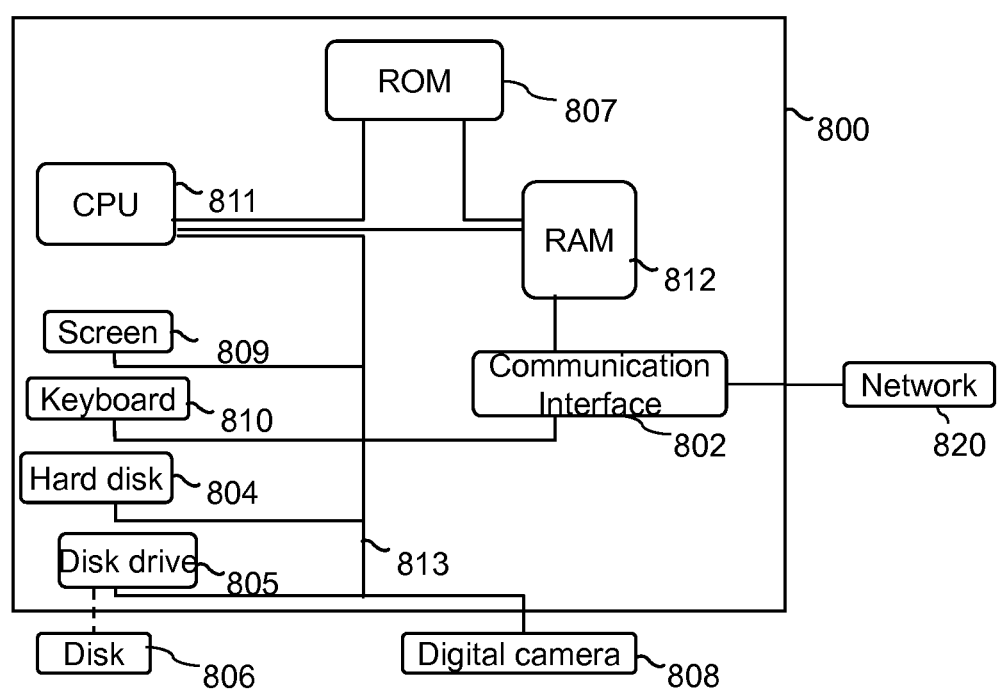
FIG. 8 is a block diagram illustrating components of a communication device in which embodiments of the invention may be implemented.

FIG. 8 schematically illustrates a communication device 800, either a client device or a server device. The communication device 800 is configured to implement at least one embodiment of the present invention. The communication device 800 may be a device such as a micro-computer, a workstation or a light portable device. The communication device 800 comprises a communication bus 313 to which there are preferably connected:
- a central processing unit 811, such as a microprocessor, denoted CPU;
- a read only memory 807, denoted ROM, for storing computer programs for implementing the invention. In particular, ROM 807 may store the received requests, the associated priority parameter values and the dependency tree;
- a random access memory 812, denoted RAM, for storing the executable code of methods according to embodiments of the invention as well as the registers adapted to record variables and parameters necessary for implementing methods according to embodiments of the invention. In particular, RAM 812 is used to store the current priority parameter values as received for each request or group of requests; and
- at least one communication interface 802 connected to the radio communication network 820 over which HTTP/2 frames can be exchanged with other communication devices (e.g. client device). The frames are written from a FIFO sending memory in RAM 812 to the network interface for transmission or are read from the network interface for reception and writing into a FIFO receiving memory in RAM 812 under the control of a software application running in the CPU 811.

Optionally, the communication device 800 may also include the following components:
- a data storage means 804 such as a hard disk, for storing computer programs for implementing methods according to one or more embodiments of the invention;
- a disk drive 805 for a disk 806, the disk drive being adapted to read data from the disk 806 or to write data onto said disk;
- a screen 809 for displaying decoded data and/or serving as a graphical interface with the user, by means of a keyboard 810 or any other pointing means.

The communication device 800 can be connected to various peripherals, such as for example a digital camera 808, each being connected to an input/output card (not shown) so as to supply data to the communication device 800.

The communication bus provides communication and interoperability between the various elements included in the communication device 800 or connected to it. The representation of the bus is not limiting and in particular the central processing unit is operable to communicate instructions to any element of the communication device 800 directly or by means of another element of the communication device 800.

The disk 806 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 807, on the hard disk 804 or on a removable digital medium such as for example a disk 806 as described previously. According to a variant, the executable code of the programs can be received by means of the communication network 803, via the interface 802, in order to be stored in one of the storage means of the communication device 800, such as the hard disk 804, before being executed.

The central processing unit 811 is adapted to control and direct the execution of the instructions or portions of software code of the program or programs according to the invention, which instructions are stored in one of the aforementioned storage means. On powering up, the program or programs that are stored in a non-volatile memory, for example on the hard disk 804 or in the read only memory 807, are transferred into the random access memory 812, which then contains the executable code of the program or programs, as well as registers for storing the variables and parameters necessary for implementing the invention.

In embodiments of the invention, the device is a programmable apparatus which uses software to implement the invention. However, alternatively, the present invention may be implemented in hardware (for example, in the form of an Application Specific Integrated Circuit or ASIC).

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of processing requests in a server device, comprising, at the server device, the steps of:
   receiving requests from a client device within one connection established with the client device;
   receiving priority parameter values, associated with the received requests, indicative of the relative order at which the client device wishes the server device to process the requests;
   building a dependency tree between the received requests using the associated priority parameter values for prioritizing the processing of the requests by the server device;
   maintaining a list of requests of the dependency tree in their removal order from the dependency tree while the server device is prioritizing the processing of the requests;
   removing a selection of requests from the dependency tree wherein the selection is based on the order of requests in the list;
   assigning relevance values to the requests of the list indicative of the order of removal of the requests from the dependency tree, where requests with lowest relevance values are to be removed first; and
   wherein the built dependency tree includes one or more virtual nodes each being associated with a stream identifier and without being associated with any of the requests from the client device, the stream identifier being already referenced in a frame received from the client device, and the method further comprising assigning relevance values to one of the virtual nodes.

2. The method of claim 1, wherein the maintaining comprises updating the order of removal of requests in the list based on at least one predefined rule.

3. The method of claim 2, wherein a predefined rule is to keep the order of removal of a request, that is parent of a plurality of requests in the dependency tree, following the order of removals of its descendants.

4. The method of claim 1, wherein the prioritizing the requests processing is triggered by the receiving of new priority parameter values from the client device.

5. The method of claim 1, further comprising processing the received requests in an order that takes into account the tree of dependencies between the requests.

6. The method of claim 5, wherein each request is associated with a stream identified by a stream identifier, and wherein a closed stream corresponds to a processed request.

7. The method of claim 6, wherein the list of requests contains only processed requests of the dependency tree.

8. The method of claim 7, wherein the maintaining of the list comprises the steps of:
   creating a list containing all processed requests of the dependency tree; and
   ordering the list in the removal order of the requests according to at least one rule.

9. The method of claim 8, wherein the at least one rule is the requests creation order and wherein the ordering causes the less recently created requests to be removed first.

10. The method of claim 9, wherein the application of the ordering step is performed each time a newly created descendant request is attached to the parent request.

11. The method of claim 8, wherein the at least one rule is the requests usage order and wherein the ordering causes the less recently used requests to be removed first.

12. The method of claim 6, wherein the building of the dependency tree comprises:
   obtaining identifiers of the streams associated with the received requests; and
   storing in memory the stream identifiers along with priority information linking hierarchically the stream identifiers.

13. The method of claim 12, wherein the removing of the selection of requests comprises deleting from memory the corresponding stream identifiers and updating the hierarchical relationship between the remaining requests of the dependency tree.

14. The method of claim 12, wherein the building of the dependency tree comprises:
   obtaining identifiers of idle and/or virtual streams not associated with the received requests; and
   storing in memory the identifiers of the idle and/or virtual streams and the identifiers of the streams associated with the received requests along with priority information linking hierarchically the identifiers.

15. The method of claim 1, further comprising deciding on whether to keep in or remove from the dependency tree identifier(s) of one or more already processed requests, and notifying the client device about the result of the deciding.

16. The method of claim 15, further comprising: receiving from the client device an indication of first type containing an identifier of a request or of a corresponding stream the client device wishes the service device to keep in the dependency tree.

17. The method of claim 15, further comprising: receiving from the client device an indication of second type comprising an identifier of a request or of a corresponding stream the client device wishes the service device to remove from the dependency tree.

18. The method of claim 1, further comprising assigning relevance values to the requests of the dependency tree, according to assignment rules, for selecting requests to be removed from the dependency tree, wherein a request that is parent of a plurality of requests in the dependency tree is assigned a relevance value greater than or equal to the highest relevance value previously assigned to one of its decedents, and
   removing a selection of processed requests from the dependency tree based on the assigned relevance values where requests with lowest relevance values are removed first.

19. The method of claim 18, wherein the assigning of relevance values comprises:
   assigning sequence numbers to the received requests; and
   updating the sequence numbers according to the assignment rules thereby obtaining the relevance values.

20. The method of claim 18, wherein the assigning of relevance values comprises:
   assigning reception timestamps to the received requests; and
   updating the timestamps according to the assignment rules thereby obtaining the relevance values.

21. The method of claim 18, wherein if a new request is inserted in the dependency tree between a parent request and the child requests of the parent request, thereby the new request becoming the new parent request of the child requests, the relevance value assigned to the new parent request is higher than the relevance values of the child requests.

22. A method of sending requests to a server device, comprising, at a client device, the steps of:
   sending requests to the server device within one connection established with the server device;

sending priority parameter values, associated with the sent requests, indicative of the relative order at which the client device wishes the server device to process the requests;

building a dependency tree between the sent requests using the associated priority parameter values for prioritizing the processing of the requests by the server device;

maintaining a list of requests of the dependency tree in their removal order from the dependency tree;

removing a selection of requests from the dependency tree wherein the selection is based on the order of requests in the list;

assigning relevance values to the requests of the list indicative of the order of removal of the requests from the dependency tree, where requests with lowest relevance values are to be removed first;

wherein the priority parameter values sent to the server device are associated with sent requests that still belong to the maintained list after the removing step is executed; and wherein the built dependency tree includes one or more virtual nodes each being associated with a stream identifier without any of the requests from the client device, the stream identifier being already referenced in a frame received from the client device, and the method further comprising assigning relevance values to one of the virtual nodes.

23. A server device in a communication network, comprising at least a processor and a memory storing a plurality of instruction, when executed, to cause the processor:

to receive requests from a client device within one connection established with the client device;

to receive priority parameter values, associated with the received requests, indicative of the relative order at which the client device wishes the server device to process the requests;

to build a dependency tree between the received requests using the associated priority parameter values for prioritizing the processing of the requests by the server device;

to maintain a list of requests of the dependency tree in their removal order from the dependency tree while the server device is prioritizing the processing of the requests;

to remove a selection of requests from the dependency tree wherein the selection is based on the order of requests in the list; and to assign relevance values to the requests of the list indicative of the order of removal of the requests from the dependency tree, where requests with lowest relevance values are to be removed first;

wherein the built dependency tree includes one or more virtual nodes each being associated with a stream identifier without any of the requests from the client device, the stream identifier being already referenced in a frame received from the client device, and the method further comprising assigning relevance values to one of the virtual nodes.

24. A non-transitory computer-readable medium storing a program which, when executed by a microprocessor or computer system in a server device of a communication network, causes the server device to perform the steps of:

receiving requests from a client device within one connection established with the client device;

receiving priority parameter values, associated with the received requests, indicative of the relative order at which the client device wishes the server device to process the requests;

building a dependency tree between the received requests using the associated priority parameter values for prioritizing the processing of the requests by the server device;

maintaining a list of requests of the dependency tree in their removal order from the dependency tree while the server device is prioritizing the processing of the requests;

removing a selection of requests from the dependency tree wherein the selection is based on the order of requests in the list; and to assign relevance values to the requests of the list indicative of the order of removal of the requests from the dependency tree, where requests with lowest relevance values are to be removed first;

wherein the built dependency tree includes one or more virtual nodes each being associated with a stream identifier without any of the requests from the client device, the stream identifier being already referenced in a frame received from the client device, and the method further comprising assigning relevance values to one of the virtual nodes.

* * * * *